United States Patent
Mazor et al.

(10) Patent No.: US 8,524,125 B2
(45) Date of Patent: Sep. 3, 2013

(54) WASHING-FAST SMOLDERING-SUPPRESSING COMPOSITIONS

(75) Inventors: Royi Mazor, Belt-Kama (IL); Itzhak Shalev, Belt-Gamliel (IL); Asher Shoshan, Beer-Sheva (IL); Michael Peled, Beer-Sheva (IL); Ella Rapaport, Moshav Shahar-Doar-Na Lachish Darom (IL); Orit Ben-Vais, Beer-Sheva (IL)

(73) Assignee: Bromine Compounds Ltd., Beer-Sheva (IL)

( * ) Notice: Subject to any disclaimer, the term of this patent is extended or adjusted under 35 U.S.C. 154(b) by 58 days.

(21) Appl. No.: 12/230,151

(22) Filed: Aug. 25, 2008

(65) Prior Publication Data
US 2009/0117797 A1    May 7, 2009

Related U.S. Application Data

(63) Continuation-in-part of application No. PCT/IL2007/000243, filed on Feb. 22, 2007.

(60) Provisional application No. 60/775,784, filed on Feb. 23, 2006.

(30) Foreign Application Priority Data

Jan. 23, 2008    (IL) .......................................... 188983

(51) Int. Cl.
| | | |
|---|---|---|
| C09K 21/00 | (2006.01) | |
| C09K 21/04 | (2006.01) | |
| C09K 21/08 | (2006.01) | |
| C01B 25/28 | (2006.01) | |
| C01B 25/45 | (2006.01) | |

(52) U.S. Cl.
USPC ........................... 252/608; 252/601; 423/306

(58) Field of Classification Search
USPC ................................ 423/306; 252/601, 608
See application file for complete search history.

(56) References Cited

U.S. PATENT DOCUMENTS

| | | | | |
|---|---|---|---|---|
| 3,414,374 | A * | 12/1968 | Stossel ........................... | 423/306 |
| 3,950,495 | A | 4/1976 | Ries | |
| 3,955,032 | A | 5/1976 | Mischutin | |
| 4,385,131 | A | 5/1983 | Fracalossi et al. | |
| 4,623,583 | A | 11/1986 | Mischutin | |
| 4,666,960 | A | 5/1987 | Spain | |
| 5,773,501 | A | 6/1998 | Watanabe et al. | |
| 6,235,347 | B1 | 5/2001 | Arshinova et al. | |
| 6,248,821 | B1 | 6/2001 | Nozaki et al. | |
| 7,504,449 | B2 | 3/2009 | Mazor et al. | |
| 2004/0121114 | A1 | 6/2004 | Piana et al. | |
| 2005/0153610 | A1 | 7/2005 | McCarthy | |
| 2006/0008664 | A1 * | 1/2006 | Wakabayashi et al. ....... | 428/516 |
| 2007/0197112 | A1 | 8/2007 | Mazor et al. | |
| 2009/0117797 | A1 | 5/2009 | Mazor et al. | |
| 2012/0115381 | A1 | 5/2012 | Mazor et al. | |

FOREIGN PATENT DOCUMENTS

| | | |
|---|---|---|
| CN | 1217060 | 8/2005 |
| EP | 0390042 | 10/1990 |
| GB | 1451335 | 9/1976 |
| GB | 2001115 | 1/1979 |
| JP | 02-196867 | 8/1990 |
| WO | WO 03/064361 | 8/2003 |
| WO | WO 03/070685 | 8/2003 |
| WO | WO 03066956 A1 * | 8/2003 |
| WO | WO 2005/103361 | 11/2005 |
| WO | WO 2006/008738 | 1/2006 |
| WO | WO 2006/013554 | 2/2006 |
| WO | WO 2007/096883 | 8/2007 |
| WO | WO 2009/093234 | 7/2009 |

OTHER PUBLICATIONS

Sinoharvest (http://www.sinoharvest.com/products/Ammonium-polyphosphate.shtml) accessed Feb. 9, 2012.*
International Preliminary Report on Patentability Dated Jan. 22, 2009 From the International Bureau of WIPO Re.: Application No. PCT/IL2007/000243.
Official Action Dated Jan. 8, 2008 From the US Patent and Trademark Office Re.: U.S. Appl. No. 11/709,726.
Official Action Dated Aug. 21, 2008 From the US Patent and Trademark Office Re.: U.S. Appl. No. 11/709,726.
Abbreviated Examination Report Under Section 18(3) Dated Dec. 9, 2008 From the UK Intellectual Property Office Re.: Application No. GB0703605.6.
Examination Report Under Section 18(3) Dated Feb. 23, 2009 From the Intellectual Property Office of the United Kingdom Re.: Application No. GB0703605.6.
International Search Report and the Written Opinion Dated Aug. 19, 2008 From the International Searching Authority Re.: Application No. PCT/IL07/00243.
International Search Report Dated Jun. 8, 2009 From the International Searching Authority Re.: Application No. PCT/IL2009/000076.
Notice of Allowance Dated Dec. 29, 2008 From the US Patent and Trademark Office Re.: U.S. Appl. No. 11/709,726.
Search Report Under Section 17(5) Dated Jun. 19, 2007 From the UK Intellectual Property Office Re.: Application No. GB0703605.6.
Written Opinion Dated Jun. 8, 2009 From the International Searching Authority Re.: Application No. PCT/IL2009/000076.
International Preliminary Report on Patentability Dated Aug. 5, 2010 From the International Bureau of WIPO Re.: Application No. PCT/IL2009/000076.
Response Dated Sep. 12, 2011 to Office Action of May 11, 2011 From the State Intellectual Property Office of the People's Republic of China Re. Application No. 200780006347.5.
Translation of Office Action Dated May 11, 2011 From the State Intellectual Property Office of the People's Republic of China Re. Application No. 200780006347.5.

(Continued)

*Primary Examiner* — Peter F Godenschwager

(57) ABSTRACT

Novel smoldering suppressing compositions containing a metal complex of ammonium superphosphoric acid and having a high phosphate content, and processes for their preparation, are disclosed. Further disclosed are formulations containing these compositions and articles-of-manufacture having these formulations applied thereon. These novel formulations are particularly effective as smoldering suppressants for textiles, and are characterized by a high washing fastness.

63 Claims, 3 Drawing Sheets
(1 of 3 Drawing Sheet(s) Filed in Color)

(56) References Cited

OTHER PUBLICATIONS

Office Action Dated Dec. 28, 2011 From the Israel Patent Office Re. Application No. 188983 and Its Translation Into English.
Translation of Office Action Dated Nov. 5, 2012 From the State Intellectual Property Office of the People's Republic of China Re. Application No. 200980110842.X.
Translation of Notice of Reason for Rejection Dated Jan. 31, 2012 From the Japanese Patent Office Re. Application No. 2008-555947.
Translation of Decision of Rejection Dated Mar. 2, 2012 From the State Intellectual Property Office of the People's Republic of China Re. Application No. 200780006347.5.
Translation of Office Action Dated Jan. 29, 2012 From the State Intellectual Property Office of the People's Republic of China Re. Application No. 200980110842.X.
Office Action Dated Dec. 20, 2012 From the Israel Patent Office Re. Application No. 188983 and Its Translation Into English.
Translation of Office Action Dated May 19, 2011 From the State Intellectual Property Office of the People's Republic of China Re. Application No. 200780006347.5.
Office Action Dated May 20, 2013 From the Israel Patent Office Re. Application No. 188983 and Its Translation Into English.
Translation of Office Action Dated Jun. 5, 2013 From the State Intellectual Property Office of the People's Republic of China Re. Application No. 200980110842.X.

* cited by examiner

WASHING-FAST SMOLDERING-SUPPRESSING COMPOSITIONS

RELATED APPLICATION/S

This application is a Continuation-In-Part of PCT Patent Application No. PCT/IL2007/000243, filed on Feb. 22, 2007, which claims the benefit of priority from U.S. Provisional Patent Application No. 60/775,784, filed on Feb. 23, 2006. This application also claims the benefit of priority from Israel Patent Application No. 188983, filed on Jan. 23, 2008.

The contents of all of the above documents are incorporated by reference as if fully set forth herein.

FIELD AND BACKGROUND OF THE INVENTION

The present invention relates to the field of flame retardation and smoldering suppression and, more particularly, to novel smoldering suppression compositions which can be beneficially utilized in textile applications.

Textiles are an essential part of everyday life and are found, for example, in draperies, cloths, furniture and vehicle upholsteries, toys, packaging material and many more applications. Consequently, textile flammability is a serious industrial concern.

The flammability of textile fabrics is typically determined by the type of fiber of which the fabric is made. Thus, for example, some synthetic fibers, such as melamine, polyaramides, carbonized acrylic, and glass, are inherently flame resistant, whereby others, such as cotton, polyester and linen, can readily ignite. Fabric flammability also depends on fabric characteristics such as thickness and/or looseness.

The term "fiber" as used herein refers to a natural or synthetic filament capable of being spun into a yarn or made into a fabric.

The terms "fabric", "textile" and "textile fabric" are used interchangeably hereinafter to describe a sheet structure made from fibers.

Several approaches have been proposed heretofore for minimizing the fire hazard of flammable textiles.

One approach involves fiber copolymerization. In this technique several fiber monomers are mixed and copolymerized, thus improving the properties of a certain fiber (e.g., made of a flammable polymer) through the enhanced properties of another fiber (e.g., made of a fire resistant polymer). This technique, however, is limited by the number of existing fire resistant polymers and their properties, and cannot be tailor-made for any substrate or requirements. Furthermore, the monomers forming the different fibers (e.g. forming a flammable polymer or a fire resistant polymer) are not necessarily compatible, for example, with regard to the type of polymerization (e.g., step polymerization versus condensation polymerization and other polymerization types), thus further limiting the applicability of this technique. An additional disadvantage of this approach is the high cost of the fire resistant polymers.

Another approach includes introduction of flame retardants (FR) in or on the fabric. Thus, flame retardants can be incorporated in the fabric either topically or as a part of the fabric.

Methods in which a flame retardant is applied topically suffer the disadvantage of the common need to apply the protective coating (which includes the FR) in large amounts (termed "high add-on") in order to obtain the required fabric characteristics. Often, such high add-on adversely affects otherwise desirable aesthetical and textural properties of the fabric. Thus, for example, upon application of a FR, fabrics may become stiff and harsh and may have duller shades, and poor tear strength and abrasion properties.

In methods where the FR forms a part of the fabric matrix, the FR, mixed with the fiber and other possible additives, is subjected to at least some of the processes involved in the fabric manufacture. These processes include, for example, extrusion or injection molding of the fibers. These techniques have many drawbacks, including, for example, the degradation of the FR agent due to the high extrusion temperatures; a reaction of the FR agent with the extruded fiber, which results in a modification of fiber properties such as fiber dyeability, fiber processability or other physical properties of the fiber; and a reaction of the FR agent with the various polymer additives, such as dyes or catalysts, which may also adversely affect the fiber properties and further require the use of large amount of FR.

In addition to the limitations associated therewith, the presently known methods for minimizing textile flammability do not necessarily provide a technical solution to the smoldering (after-flame burning) of fabrics.

Fabric smoldering is an acute problem, and is particularly critical in fabrics that contain a high ratio of cellulose (such as, for example, cotton, viscose, linen or other vegetable fibers).

While textiles may be resistant to open flame burning, the smoldering (also termed "after flame"), which may persist after the open flame has been extinguished, can eventually lead to complete digestion of the fabric (see, for example, "Toxicological Risks of Selected Flame-Retardant Chemicals-2000", Donald E. Gardner (Chair), Subcommittee on Flame-Retardant Chemicals, Committee on Toxicology, Board on Environmental Studies and Toxicology, National Research Council). Obviously, this leads to failure in many standard flammability tests (see, for example, U.S. Pat. Nos. 3,955,032 and 4,600,606; and V. Mischutin, "Nontoxic Flame Retardant for Textiles" in J. Coated Fabrics, Vol. 7, 1978, pp. 308-318).

Although one solution to this problem is coating the textile fabric with an impermeable material, the feel of such a product is greatly damaged.

Accordingly, in order to overcome the smoldering problem in textiles, the addition of a smoldering suppressant (SS), which is also referred to herein, interchangeably, as a smoldering suppressing agent, is frequently required.

Choosing the right flame retardant, the right smoldering suppressant and the right application method largely depends on the substrate which has to be protected: the protection of a garment, or the protection of an electrical appliance will inherently pose different requirements and restrictions of the flame retardant used.

Presently, there are four main families of flame-retardant chemicals:

Inorganic flame retardants (such as aluminum oxide, magnesium hydroxide and ammonium polyphosphate);
Halogenated flame retardants, primarily based on bromine and chlorine;
Organophosphorus flame retardants, which are primarily phosphate esters; and
Nitrogen-based organic flame retardants.

Bromine-containing compounds, in particular aromatic bromines, have been long established as flame retardants but suffer major disadvantages including, for example, high bromine content demand, high dry add-on (binder) demand and a need to add compounds which enhance the flame retardancy (hereinafter termed "synergists"). In addition, application of such FRs on fabrics may result in streak marks on dark fabrics, excessive dripping during combustion of thermoplastic fibers, relatively high level of smoldering and a general instability of the flame retardant dispersion which may prevent a uniform application thereof on the fabric.

Over the years, several antimony-based compounds have been used as flame-retardant synergists, including $Sb_2O_3$, $Sb_2O_5$ and $Na_3SbO_4$ (Touval, I., (1993) "Antimony and other inorganic Flame Retardants" in Kirk Othmer's Encyclopedia of Chemical Technology, Vol. 10, p. 936-954, $4^{th}$ Edition, John Wiley and Sons, N.Y.). Antimony based compounds are very expensive and are therefore not used on their own, but are used as synergists with other flame retardants. The addition of antimony oxide to halogenated flame retardants increases their efficiency and reduces the amount of additives and/or halogenated FR agent to be used. However, the addition of such synergist is costly and further contributes to the high add-on of the formulation.

Phosphorus-based flame retardants have been a major source of interest to replace halogen compounds. Phosphorus-based flame retardants are characterized by producing environmentally friendly by-products, low toxicity, and low production of smoke in fire, and are highly effective flame retardants for cellulose and cellulose derivatives. Phosphorus-based flame retardant compounds promote dehydration and char formation. However, although cotton fabrics treated with phosphoric acid exhibited good flame retardancy and acceptable tensile strength retention, presently used phosphoric acids have poor durability of the flame retardancy to washing, due to the water solubility of the phosphoric acid. Moreover, it was found that fabrics treated with phosphoric acid turned yellow and became tender when the concentration of phosphoric acid increased (Charuchinda et al., J Sci. Res. Chula. Univ, Vol. 30, No. 1 (2005) 97-106).

Examples of commonly utilized smoldering suppressing agents include urea, melamine and phosphate salts. Furthermore, it has been recently shown that compositions that combine phosphates and halogen display a synergism in flame retardation (E. S. Lee, "Possible Phosphorous Synergy in Polyester-Cotton Fabric Treated with Tetrabromobisphenol A and Diammonium Phosphate", J. App. Pol. Sci., Vol. 84, 2002, pp. 172-177) and that phosphate and borate compounds are efficient flame retardants in the solid phase during combustion (G. Camino, M. P. Luda, "Fire Retardancy of Polymers: The use of Intumescents", M. Le Bras, G. Camino, S. Bourbigot, R. Delobel, The Royal Society of Chemistry, 1888, p. 48; R. Dombrowski, "Formulating Flame Retardant Coatings", Coated Fabrics Technology, Clemson University, 1998).

Phosphate salts are salts of phosphoric acids of varying chain lengths. The most basic phosphoric acid unit is phosphoric acid ($H_3PO_4$, also termed monophosphoric acid or orthophosphoric acid) which can undergo dehydration so as to form a series of higher molecular weight condensates. For example, the formation of di-phosphoric acid ($H_4P_2O_7$, also termed pyrophosphoric acid) and of tri-phosphoric acid is depicted in scheme 1 below:

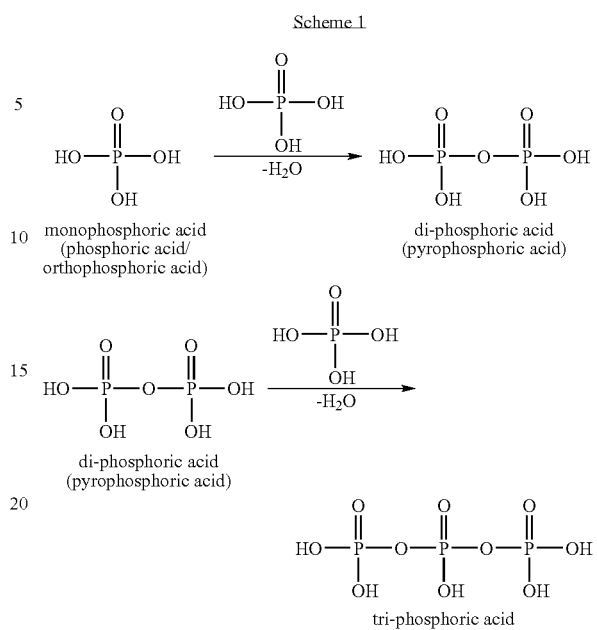

The dehydration can continue so as to form additional oligomeric condensates of phosphoric acid, which may be collectively described as $HO-(HPO_3)_n-H$ (or $H_{n+2}P_nO_{3n+1}$), where n is an integer, as is depicted below:

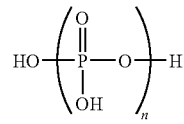

These higher forms of phosphoric acid are typically termed "polyphosphoric acid(s)" (PPA), and are sometimes also referred to as "superphosphoric acid(s)" (SPA), "phosphoric anhydride(s)" or "condensed phosphoric acid(s)". In some cases the polyphosphoric acids may further form closed ring systems, which are then termed meta-phosphoric acids.

Examples of metaphosphoric acids are depicted in scheme 2 below:

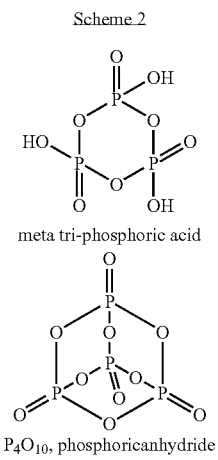

Polyphosphoric acids appear as mixtures of several oligomers (including ortho, pyro, tri, tetra and higher condensed acids), and are defined by the distribution of the various chain lengths, as well as by the average $P_2O_5$ content thereof (by weight) or by the average $H_3PO_4$ content thereof by weight (the average $H_3PO_4$ content being 1.38 times the average $P_2O_5$ content).

Commercially available polyphosphoric acids are classified by two CAS Registry numbers: CAS No. 7664-38-2 which is defined as an acid containing between 50% to 75% $P_2O_5$ by weight (corresponding to 70% to 104% $H_3PO_4$ by weight), and CAS No. 8017-16-1 which is defined as a compound having at least 80% $P_2O_5$ by weight (corresponding to at least 110% of $H_3PO_4$ by weight). The percentages defining the constituents in a polyphosphoric acid composition thus describe the relative weight percentages of each constituent.

The relation between the distribution of dehydration products, the percentage of $P_2O_5$ and the percentage of $H_3PO_4$ is exemplified in Table 1 below.

gelation properties on one hand, and as being an environmentally friendly substance, on the other hand. Thus, for example, a liquid fertilizer that includes aluminum ammonium polyphosphate $AlNH_4HP_3O_{10}$, containing 71.2% $P_2O_5$, equivalent to 47.6% $PO_4^{3-}$, is described by Rilo and Turchin (Zhurnal Prikladnoi Khimii, 1975, 48(1), 199-200). As taught in this publication, this complex was prepared by reacting $H_3PO_4$ and ammonia at 200-300° C.

In another study, an amorphous fertilizer system containing aluminum, ammonia, phosphate and water, and between 5% and 33% by weight of $P_2O_5$, equivalent to between 3.3% and 22% by weight $PO_4^{3-}$, is described by Lapina. L. M and Grishina, L. A, in "Tr. Nauch-Issled. Inst. Udobr. Insektofungits" (1973) No. 221, pp. 56-62. This publication further teaches the advantageous use of amorphous fertilizers, which are capable of containing more nutrients within the amorphous structure, as compared to crystalline fertilizers.

Ammonium taranakite $(NH_4)_3Al_5H_6(PO_4)_8 \cdot 18H_2O$, $(NH_4)_2 AlH(PO_4)_2 \cdot 4H_2O$ and $NH_4Al(PO_4)OH \cdot 2H_2O$, are

TABLE 1

| $H_3PO_4$ (%) | $P_2O_5$ (%) | Percentage Composition in Terms of the Constituent Poly phosphoric Acids (1 = orthophosphoric acid, 2 = pyrophosphoric acid etc.) | | | | | | | | | | | | | | High-Poly. | Tri-Meta | tetra-Tetra-Meta |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | | | |
| 93.0 | 67.4 | 100.0 | | | | | | | | | | | | | | | | |
| 94.8 | 68.7 | 99.7 | 0.33 | | | | | | | | | | | | | | | |
| 97.2 | 70.4 | 96.2 | 3.85 | | | | | | | | | | | | | | | |
| 99.0 | 71.7 | 91.0 | 8.86 | trace | | | | | | | | | | | | | | |
| 101.5 | 73.5 | 77.1 | 22.1 | 0.79 | | | | | | | | | | | | | | |
| 102.0 | 73.9 | 73.6 | 25.1 | 1.34 | | | | | | | | | | | | | | |
| 104.5 | 75.7 | 53.9 | 40.7 | 4.86 | 0.46 | | | | | | | | | | | | | |
| 107.0 | 77.5 | 33.5 | 50.6 | 11.5 | 2.68 | 0.74 | trace | | | | | | | | | | | |
| 109.2 | 79.1 | 22.1 | 46.3 | 20.3 | 7.82 | 2.26 | 1.02 | 0.34 | | | | | | | | | | |
| 111.1 | 80.5 | 13.8 | 38.2 | 23.0 | 13.0 | 6.86 | 3.38 | 1.67 | 1.03 | 0.22 | | | | | | | | |
| 111.8 | 81.0 | 12.2 | 34.0 | 22.7 | 14.6 | 8.42 | 4.36 | 2.27 | 1.41 | 0.56 | trace | | | | | | | |
| 112.1 | 81.2 | 10.9 | 32.9 | 22.3 | 15.0 | 9.36 | 5.41 | 2.85 | 1.75 | 0.97 | 0.36 | 0.05 | | | | | | |
| 113.7 | 82.4 | 7.32 | 23.0 | 19.3 | 15.9 | 12.3 | 8.21 | 5.73 | 3.89 | 2.52 | 1.36 | 0.91 | 0.14 | | trace | | | |
| 116.0 | 84.0 | 3.92 | 11.8 | 12.7 | 12.0 | 10.5 | 8.97 | 7.99 | 6.62 | 5.63 | 4.54 | 3.72 | 3.03 | 2.46 | 1.68 | 6.63 | | |
| 117.3 | 85.0 | 2.28 | 6.36 | 7.32 | 8 | 8.17 | 7.67 | 7.22 | 6.93 | 6.42 | 5.89 | 5.27 | 4.69 | 3.99 | 3.83 | 16.9 | | |
| 117.7 | 85.3 | 1.87 | 4.73 | 6.33 | 6.6 | 6.66 | 6.71 | 6.36 | 6.11 | 5.88 | 5.46 | 5.07 | 4.90 | 4.64 | 4.38 | 25.6 | | |
| 118.9 | 86.1 | 1.46 | 2.81 | 3.74 | 4.4 | 4.52 | 4.77 | 4.79 | 4.93 | 4.67 | 4.54 | 4.67 | 4.63 | 4.38 | 4.17 | 43.5 | 0.17 | |
| 120.2 | 87.1 | 0.83 | 1.18 | 2.17 | 2.5 | 3.09 | 3.39 | 3.46 | 3.33 | 3.55 | 3.47 | 3.45 | 3.52 | 3.26 | 3.24 | 61.1 | trace | |
| 121.3 | 87.9 | 0.50 | 0.82 | 1.56 | 1.8 | 1.72 | 2.03 | 2.3 | 2.26 | 2.07 | 2.26 | 2.06 | 2.20 | 1.99 | 2.30 | 76.4 | 0.42 | 0.11 |
| 123.4 | 89.4 | 1.88 | 1.52 | 0.77 | 0.6 | 0.62 | 0.68 | 0.54 | 0.71 | 0.86 | 1.03 | 0.98 | 1.16 | 1.23 | 1.37 | 86.8 | 1.7 | 0.41 |

Phosphate salts which are derived from ammonia (ammonium phosphate compounds) and their metal salts have long been used in agriculture as fertilizers, supplying both nitrogen and phosphorous (Zdukos et al, "Reactions for the Formation of Calcium Ammonium Polyphosphates in Fertilizers", VINITI, Moscow, 1974; Tonsuaadu et al, "Phosphorus, Sulfur and Silicone", Vol. 179, No 11, p. 2395, 2004; Lapina et al, "Metal ammonium phosphates: Production of iron and aluminum phosphates", Nauk SSSR, Otd. Biofiz. Khim. Fiziol. Aktiv. Soedin, 1966, 265-274). Stabilized liquid fertilizer suspensions of calcium ammonium pyrophosphate, comprising crystals smaller than 50 microns, have been prepared from ammonium pyrophosphate (derived from pyrophosphoric acid) and from vitreous calcium silicate, and have been claimed to inhibit the growth of large crystals in the primary component of the fertilizer suspension, i.e. ammonium phosphate (see, U.S. Pat. No. 3,526,495, to Philen).

Other fertilizer compositions comprising calcium ammonium pyrophosphate have been described by Brown and Fraizier in the 60's (U.S. Pat. No. 3,053,623, also in Agriculture and Food Chemistry, Vol. 11, No. 3, p. 214, 1963, and in Agriculture and Food Chemistry, Vol. 12, No. 1 p. 70, 1964).

Aluminum ammonium phosphate has been extensively used in the preparation of amorphous gels, due its potent known to be formed from ammonium phosphate fertilizers in the soil. These substances were characterized by Frazier and Taylor, as early as 1956, as containing up to 19% phosphorus, equivalent to 57.9% $PO_4^{3-}$, and were synthesized by extremely prolonged reactions (over 3 weeks) at room temperature (see, for example, "Characterization of Taranakites and Ammonium Aluminum Phosphates", Soil Science Society Proceedings, 1956, 545-547).

U.S. Pat. No. 2,909,451 to Lawler and Vartanian, teaches aluminum phosphate dispersions, in particular those prepared from a water-soluble aluminum salt and at least a stoichiometric amount of a water-soluble orthophosphate. No mention is made in this patent to the phosphate content in the final product. Furthermore, this patent teaches a precipitated aluminum phosphate preparation, which is thereafter dispersed in a liquid medium to obtain a thixotropic composition. This patent is therefore silent with respect to gel preparation.

The use of pyrophosphate salts as flame retardants and smoldering suppressants has also been known in applications which do not require durable agents, namely, applications which require minimal or no stability to UV light, heat, water, detergents, air-pollutants or chemicals. For example, the use of magnesium salts of ammonium pyrophosphate as flame retardants is mentioned in a report by A. A. Gansh and I. M. Kaganskii (*Prace Naukowe Akademii Ekonomicznej imienia Oskara Langego we Wroclawiu* (1990), 526 107-11).

It is reported that the smoldering suppression effect of phosphate salts is achieved by the release of phosphoric acid upon heating, which promotes char formation instead of flammable volatiles production. These compounds can thus absorb the heat by swelling or foaming and are often employed in intumescing systems (Environmental Health Criteria 192, World Health Organization, Geneva, 1997).

Another class of phosphate salts is the group of ammonium polyphosphates (APP, derived from various polyphosphoric acids), which have been used as smoldering suppressants in plastics and as FR or smoldering suppressants in "nondurable" applications.

The preparation of APP has been described, for example, in U.S. Pat. Nos. 3,342,579 and 3,397,035.

According to the teachings of U.S. Pat. No. 3,342,579, a short-chain, slightly water-soluble APP can be synthesized from polyphosphoric acid in water upon the addition of ammonia gas, at a temperature of 193° C. and at a pressure of 20 atmospheres.

According to the teachings of U.S. Pat. No. 3,397,035, a long-chain, water-insoluble crystalline APP can be synthesized from dry ammonium orthophosphoric acid and urea, at a temperature of 260° C.

An exemplary smoldering suppressant and FR of this family is aluminum ammonium polyphosphate. For example, it has been reported by Mironovitch et al., in "Khimicheskaya Promyshlennost" (1975), 3, pp. 207-209) that $AlNH_4H_2(PO_4)_2 \cdot 0.5H_2O$ is formed by a reaction of $Al(H_2PO_4)_3$ with $NH_4OH$ and contains $P_2O_5$ in a total amount of 46% and higher, and in an amount of 10% and higher in the aqueous solution. An amount of 46% $P_2O_5$ is equivalent to 31% $PO_4^{3-}$. It should be noted however that this publication fails to show neither a product nor a process for obtaining such an aluminum ammonium polyphosphate with $P_2O_5$ content higher than 46%. Further, the aluminum ammonium polyphosphate referred to in this publication is referred to as a water-immiscible product, which is not suitable in applications requiring durable FRs since it contains miscible ingredients.

Crystalline aluminum APP obtained at high temperature (350° C.) is also described in Averbuch-Pouchot and Guitel (*Acta Cryst., B*33 (1977), 1436-1438). Other crystalline aluminum APPs are discussed by Golub and Boldog (*Russian Journal of Inorganic Chemistry*, 19(4), 1974, pages 499-502). U.S. Pat. No. 4,956,172 teaches crystalline aluminum ammonium phosphate, $Al_2(NH_4)OH(PO_4)_2 \cdot 2H_2O$ obtained by a reaction of $Al(OH)_3$ with $(NH_4)_2HPO_4$ or $NH_4H_2PO_4$, again at elevated temperatures (125-250° C.), for use as a dentifrice polishing agent and filler for plastics.

The use of the described metal complexes of ammonium phosphates as anti-smoldering agents in textile applications has been substantially limited by low fastness to laundry processes. When applied on textiles, the ammonium phosphate additive is washed off within one or few washing cycles. Once this material is washed off, the treated fabric again fails the flammability tests due to prolonged smoldering.

It has been suggested that the instability of APP during laundry is due to the high solubility of ammonium phosphates in water under laundry conditions (basic pH and large amount of water in each cycle), which is further increased by the hydrolysis thereof. It has also been suggested that the ammonium phosphates are incompatible with the acrylic binders used in the coatings, thus resulting in a phase separation which appears as a brittle film.

Furthermore, although many treatments confer wash-resistant flame retardancy in the sense that the retardant will not be removed by laundering, the effect of the detergent used in the washing process is oftentimes neglected, although it may be quite significant. The main concern in this case is that the detergent solution may exchange the ionizable volatile cations on the flame retarded fabric, by sodium ions from the detergent, thus causing (a) an increased solubility of the sodium phosphate salt, and (b) if sufficient ions of the flame retarded fabric are replaced by sodium, the resistance to flaming will be much reduced, as is detailed hereinafter.

Interestingly, it has been found that the flame retardancy effectiveness of the phosphate complexes largely depends on the counter ion. For example, the effectiveness of a metal phosphate as a flame retardant of a cellulose fiber is in an order of magnitude less than that of an ammonium phosphate (J. W. Lyons, *The Chemistry and Uses of Fire Retardants*, Wiley-Interscience, New York, 1970). Table 2 below presents exemplary values of the amount of substance needed to render cellulose nonflammable as a function of the phosphate counter ion (W. H. Perkin, J. Ind. Eng. Chem., 5, 57 (1913)).

TABLE 2

| Substance | Parts/100 Parts cellulose |
| --- | --- |
| Ammonium phosphate | 4.5 |
| Sodium phosphate | 30.0 |
| Aluminum phosphate | 30.0 |
| Calcium phosphate | 30.0 |
| Magnesium phosphate | 30.0 |

Thus, the laundry fast flame retardant and/or smoldering suppressant has to be not only chemically resistant to water, but also, at least to some degree, immune to ion exchange.

In an attempt to improve the durability of phosphate salts, chitosan, which is a natural biopolymer containing an amino group, was recently co-applied with sodium polyphosphate onto cotton fabric (Charuchinda et al. 2005, supra), expecting that the co-application of chitosan would impart a synergistic activity with the phosphoric acids by enhancing the formation of intumescent chars. However, results showed that while the flame retardancy of cotton treated with this mixture slightly increased, and a film layer was observed, after only one mild washing (for 30 minutes at 50° C.) the flame retardancy was almost identical to that of the untreated fabric.

SUMMARY OF THE INVENTION

The prior art teaches smoldering suppressing agents which exhibit limited performance, particularly when applied on textiles.

When used in textiles, an applied flame retardant and/or smoldering suppressing agent has to be: (a) compatible with the fabric; (b) non-damaging to the aesthetical and textural properties of the fabric; (c) transparent; (d) light stable; (e) resistant to extensive washing and cleaning; (f) environmentally and physiologically safe; (g) of low toxic gas emittance; and (h) inexpensive. Above all, a flame retardant or smoldering suppressant agent should pass the standard flammability and smoldering tests in the field.

Some of these properties such as stability to UV light, heat, water, detergents and air-pollutants, as well as chemical stability, may be summed-up under the term "durability". Currently, there are no clear-cut standards to define fabric durability, and it is typically defined as a fabric meeting its performance standard after 5, 10 or 50 washing cycles.

In addition, since smoldering occurs in substrates having an extremely low oxygen demand, a smoldering suppressing agent has to prevent the substrate from reacting with even a minimal amount of oxygen The present inventors have now uncovered that by utilizing ammonium superphosphoric acid, having a high phosphate content, metals complexes thereof are obtained. These metal complexes are characterized by high phosphate content and further by high stability. The present inventors have further uncovered that such complexes can be advantageously formulated, optionally in the presence of flame retardants, and utilized as washing-fast smoldering suppressing compositions, particularly when applied on flammable substrates such as textiles.

Thus, according to one aspect of the present invention there is provided a smoldering suppressing composition comprising a complex of a multivalent metal and ammonium superphosphoric acid, the composition containing $PO_4^{3-}$ in an amount of at least 60 weight percents.

According to further features in preferred embodiments of the invention described below, the complex contains $PO_4^{3-}$ in an amount of at least 60 weight percents.

According to still further features in the described preferred embodiments the multivalent metal is selected from the group consisting of a divalent metal and a trivalent metal.

According to still further features in the described preferred embodiments the divalent metal is calcium.

According to still further features in the described preferred embodiments the trivalent metal is aluminum.

According to still further features in the described preferred embodiments the superphosphoric acid comprises at least 82 weight percents of $P_2O_5$.

According to still further features in the described preferred embodiments the superphosphoric acid comprises at least 83 weight percents of $P_2O_5$.

According to still further features in the described preferred embodiments the superphosphoric acid comprises less than 35 weight percents of pyrophosphoric acid.

According to still further features in the described preferred embodiments the superphosphoric acid comprises less than 15 weight percents of pyrophosphoric acid.

According to still further features in the described preferred embodiments the composition is in a form of a gel, preferably an amorphous gel.

According to still further features in the described preferred embodiments the composition is in a form of a dry powder.

Preferably, the dry powder is a gellable powder, forming a gel upon contacting an aqueous solution.

According to another aspect of the present invention there is provided a process of preparing the composition described herein, the process comprising mixing the superphosphoric acid, a salt of the multivalent metal, and ammonia, thereby obtaining the composition.

According to further features in preferred embodiments of the invention described below, the salt is selected from the group consisting of a chloride salt, a carbonate salt and a hydroxy salt.

According to still further features in the described preferred embodiments the mixing is performed in the presence of an aqueous solution.

According to still further features in the described preferred embodiments the mixing is performed while maintaining a pH of the solution higher than 7.

According to still further features in the described preferred embodiments the mixing is performed at a temperature that ranges from about 50° C. to about 150° C., preferably from about 50° C. to about 75° C.

According to still further features in the described preferred embodiments the process further comprising drying the composition, to thereby obtain a powder.

According to yet another aspect of the present invention there is provided a smoldering suppressing formulation comprising the composition described herein.

According to further features in preferred embodiments of the invention described below, the formulation further comprising at least one additive selected from the group consisting of a surface active agent, a wetting agent, a dispersing agent, a suspending agent, an antifoaming agent, a preservative, a stabilizing agent, a binding agent, a thickening agent, a salt, an oxide and any mixture thereof.

According to still further features in the described preferred embodiments the formulation further comprising a brominated co-polymer.

According to still further features in the described preferred embodiments the binding agent is selected from the group consisting of an acrylate, a polyurethane, or a polyvinyl chloride (PVC).

According to still another aspect of the present invention there is provided a flame retardant and smoldering suppressing formulation comprising the smoldering suppressing composition or the smoldering suppression formulation described herein and at least one flame retardant.

According to further features in preferred embodiments of the invention described below, the at least one flame retardant is selected from the group consisting of tetrabromobisphenol A-bis(2,3-dibromopropyl ether) (FR-720), decabromodiphenyloxide (DECA), hexabromocyclododecane (HBCD) and pentabromobenzylbromide (PBBBr).

According to still further features in the described preferred embodiments the formulation is in a form of an aqueous dispersion.

According to still further features in the described preferred embodiments the formulation further comprising a flame retardant synergist.

According to still further features in the described preferred embodiments the synergist is antimony oxide (AO).

According to still further features in the described preferred embodiments a molar ratio between an elemental antimony in the AO and an elemental halogen in the halogenated flame retardant ranges from 1:1 to 1:50.

According to an additional aspect of the present invention there is provided a kit comprising a packaging material and the smoldering suppressing composition or formulation described herein, being packaged in the packaging material.

According to further features in preferred embodiments of the invention described below, the smoldering suppressing composition is in a powder form.

According to still further features in the described preferred embodiments the kit further comprising an aqueous solution, wherein the powder and the aqueous solution are individually packaged within the kit.

According to still further features in the described preferred embodiments the kit further comprising a flame retardant.

According to still further features in the described preferred embodiments the flame retardant is packaged in the form of an aqueous dispersion thereof.

According to a further aspect of the present invention there is provided an article-of-manufacture comprising a flammable substrate and the smoldering suppressing formulation described herein being applied thereon.

According to further features in preferred embodiments of the invention described below, the flammable substrate comprises a flammable textile fabric.

According to still further features in the described preferred embodiments the article-of-manufacture is characterized by an after flame time, as defined by ASTM D 6413 12 seconds ignition test, of less than 3 seconds.

According to still further features in the described preferred embodiments the article-of-manufacture is characterized by an after flame time, as defined by ASTM D 6413 12 seconds ignition test, of 0 seconds.

According to still further features in the described preferred embodiments the after flame time remains substantially unchanged upon subjecting the article-of-manufacture to at least 1 washing cycle.

According to still further features in the described preferred embodiments the after flame time remains substantially unchanged upon subjecting the article-of-manufacture to at least 25 washing cycles.

According to still further features in the described preferred embodiments the article-of-manufacture is characterized by an after glow time, as defined by ASTM D 6413 12 seconds ignition test, of less than 150 seconds.

According to still further features in the described preferred embodiments the article-of-manufacture is characterized by an after glow time, as defined by ASTM D 6413 12 seconds ignition test, of less than 30 seconds.

According to still further features in the described preferred embodiments the after glow time remains substantially unchanged upon subjecting the article-of-manufacture to at least 1 washing cycle.

According to still further features in the described preferred embodiments the after glow time remains substantially unchanged upon subjecting the article-of-manufacture to at least 25 washing cycles.

According to still further features in the described preferred embodiments the article-of-manufacture is characterized by a char length, as defined by ASTM D 6413 12 seconds ignition test, of less than 25 centimeters.

According to still further features in the described preferred embodiments the article-of-manufacture is characterized by a char length, as defined by ASTM D 6413 12 seconds ignition test, of less than 15 centimeters.

According to still further features in the described preferred embodiments the char length remains substantially unchanged upon subjecting the article-of-manufacture to at least 1 washing cycle.

According to still further features in the described preferred embodiments the char length remains substantially unchanged upon subjecting the article-of-manufacture to at least 25 washing cycles.

According to still further features in the described preferred embodiments the article-of-manufacture is characterized as passing an ASTM D 6413 12 seconds ignition test.

According to still further features in the described preferred embodiments the article-of-manufacture is characterized as passing an ASTM D 6413 12 seconds ignition test, upon subjecting the article-of-manufacture to at least 1 washing cycle.

According to still further features in the described preferred embodiments the article-of-manufacture is characterized as passing an ASTM D 6413 12 seconds ignition test, upon subjecting the article-of-manufacture to at least 25 washing cycles.

According to still further features in the described preferred embodiments the article-of-manufacture is characterized by at least one aesthetical or textural property which is substantially the same as that of the flammable substrate per se.

According to still further features in the described preferred embodiments the property remains substantially unchanged upon subjecting the article-of-manufacture to at least 1 washing cycle.

According to still further features in the described preferred embodiments the property remains substantially unchanged upon subjecting the article-of-manufacture to at least 25 washing cycles.

According to yet a further aspect of the present invention there is provided a process of applying the formulation described herein to a textile substrate, the process comprising contacting the substrate with the smoldering suppressing formulation.

According to further features in preferred embodiments of the invention described below, the process further comprising, subsequent to the contacting, heating the substrate.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

As used herein, the term "comprising" means that other steps and ingredients that do not affect the final result can be added. This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

The term "method" or "process" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the singular form "a," "an," and "the" include plural references unless the context clearly dictates otherwise. For example, the term "a compound" or "at least one compound" may include a plurality of compounds, including mixtures thereof.

Throughout this disclosure, various aspects of this invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein, the term "about" refers to ±10%.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

Figure 1A:
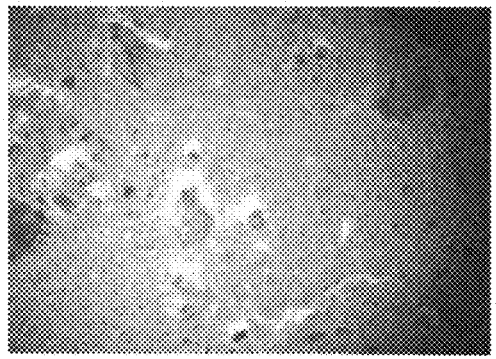
Figure 1B:
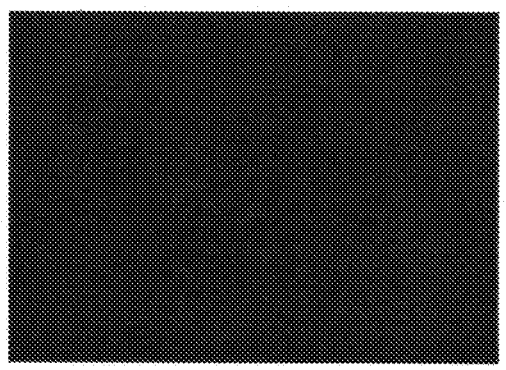
Figure 2A:
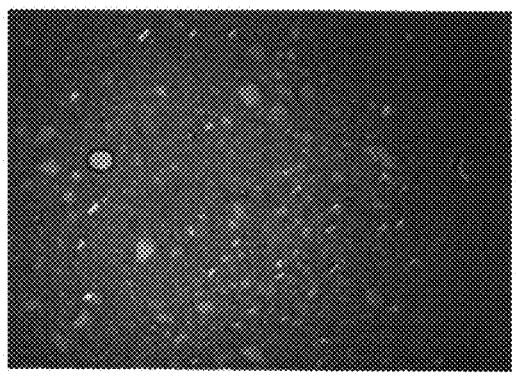
Figure 2B:
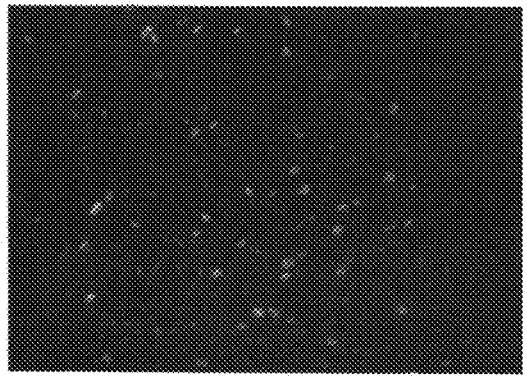
Figure 3:
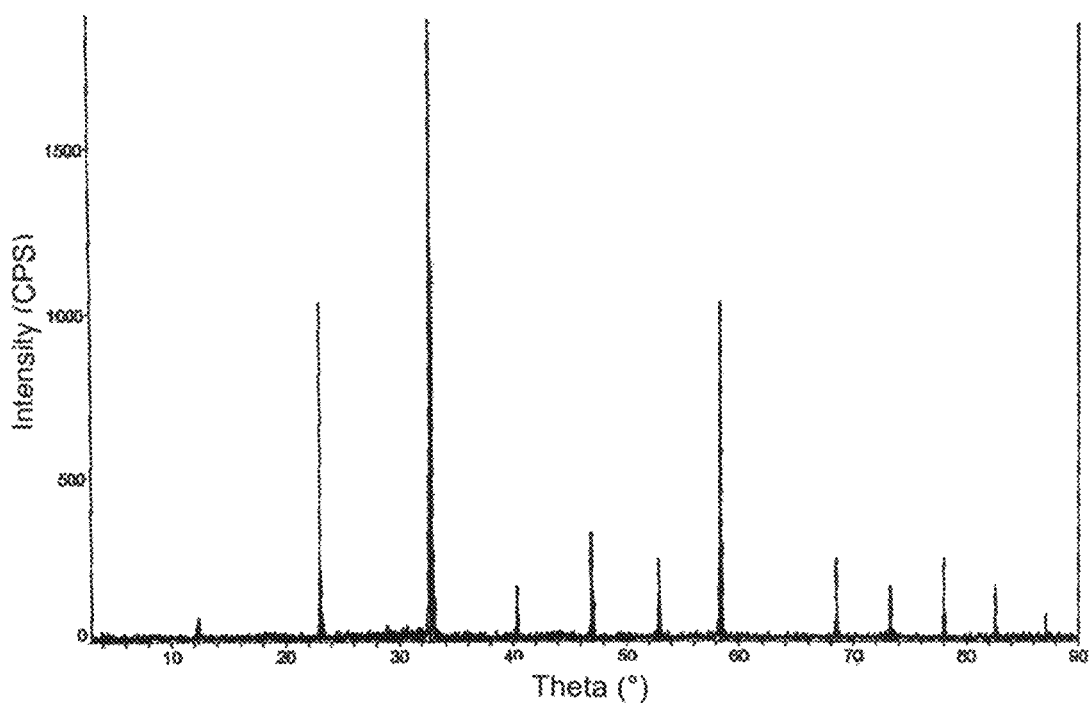

FIGS. 1A and 1B present images of non-crossed polars (FIG. 1A) and of crossed polars (FIG. 1B) of a calcium ammonium superphosphate (CaASP) amorphous gel prepared from superphosphoric acid according to preferred embodiments of the present invention;

FIGS. 2A and 2B present images of non-crossed polars (FIG. 2A) and of crossed polars (FIG. 2B) of a calcium ammonium diphosphate (CaADP) crystalline suspension prepared from pyro-phosphoric acid;

FIG. 3 presents an X-ray diffractogram of a crystalline CaADP gel; and

Figure 4:
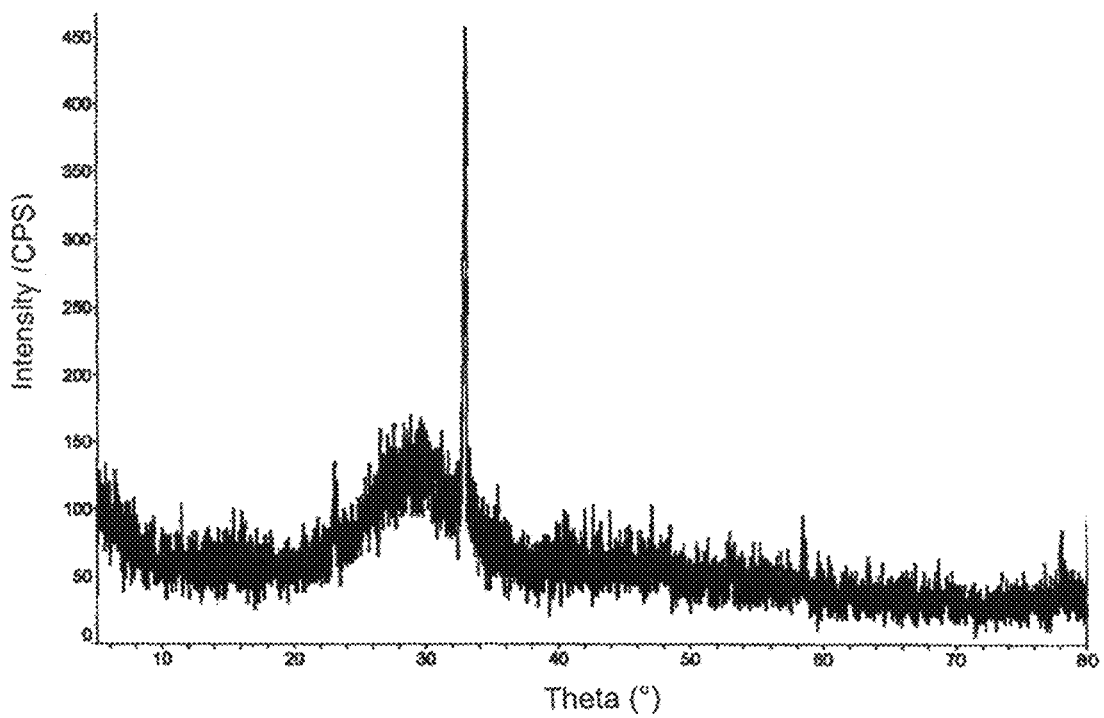

FIG. 4 presents an X-ray diffractogram of an amorphous CaASP gel, according to preferred embodiments of the present invention.

DESCRIPTION OF THE PREFERRED EMBODIMENTS

The present invention, in some embodiments thereof, is of novel smoldering suppressing compositions and of formulations comprising same, which can be efficiently applied on flammable substrates such as textile fabrics. The present invention, in some embodiments thereof, is thus further of articles-of-manufacture treated by these smoldering suppression compositions or formulations. The smoldering suppressing compositions of the present embodiments are characterized by a high phosphate content and can be in a form of, for example, a gel or a gellable powder.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

As discussed in detail hereinabove, ammonium polyphosphate (APP) is a general term encompassing compounds derived from phosphoric acids of varying length, such as, for example, orthophosphoric acid (1 phosphate unit), pyrophosphoric acid (2 phosphate units) and superphosphoric acid (also termed polyphosphoric acid, comprising of a mixture of $P_2O_5$ hydration products of varying lengths, as displayed in Table 1 hereinabove).

As is further discussed in detail hereinabove, ammonium phosphate compounds and their metal salts are mostly known as agricultural fertilizers, and to a lesser extent, as flame retardants (FR) and smoldering suppressants (SS). However, the use of these compounds as flame retardants (and smoldering suppressants) in the treatment of textiles has been limited heretofore mainly due to the high water-solubility of these compounds, and due to their high susceptibility to ion-exchange with sodium ions often present in laundry detergents, which lead to facile washing off of these agents.

A recent attempt to improve the durability of phosphate salts, by mixing with chitosan, proved unsatisfactory, as after only one mild washing the flame retardancy of the treated fabric was almost identical to that of the untreated fabric (Charuchinda et al. 2005, supra).

In a search for novel smoldering suppressing compositions, and particularly such compositions which can be beneficially used for application on textile substrates, the present inventors have envisioned that compositions of metal ammonium polyphosphates having a high phosphate content could be efficiently used as washing-fast smoldering suppressing compositions.

While reducing the present invention to practice, it was indeed found that complexes of calcium ammonium superphosphate (CaASP), magnesium ammonium superphosphate (MgASP) and aluminum ammonium superphosphate (AlASP), having a high $PO_4^{3-}$ content, can form stable yet effective and washing-fast smoldering suppressing compositions, which are characterized by an increased water insolubility, as well as an increased resistance to ion exchange with the detergent sodium ion, as compared to ammonium polyphosphate (APP) and salts thereof. It has further been found that these compositions can form stable gels upon contact with an aqueous solution, and further can re-form these gels, even after being dried to a powder, by re-contacting this powder with an aqueous solution, while maintaining the characteristic features of the compositions.

Thus, it has been established herein that compositions of multivalent metal ammonium superphosphates, such as CaASP, MgASP and AlASP, characterized as having at least 60 weight percents of $PO_4^{3-}$, and preferably being in a form of stable amorphous gel compositions, could serve as efficient and durable smoldering suppressants and be incorporated in formulations that can be beneficially applied onto flammable substrates such as textile fabrics, while overcoming the limitations associated with the lack of washing-fastness of the presently known smoldering suppressant formulations.

Furthermore, it has been established that these multivalent metal ammonium superphosphate gel compositions may be dried, conveniently stored as powders, optionally being mixed with other flame retardant or smoldering suppressant powders, to then re-form the advantageous gels upon the addition of an aqueous solution, without losing their smoldering suppressing and/or washing fastness properties.

As is demonstrated in the Examples section that follows, these novel compositions were found to be effective smoldering suppressing agents when applied on textiles. The smoldering suppression, flame retardancy and washing fastness properties of these compositions were demonstrated in combination with various flame retardants. As is further exemplified in the Examples section which follows, fabrics treated by the compositions of the present embodiments passed the acceptable washing fastness and flame retardancy tests, while maintaining their aesthetical and textural properties.

Thus, according to one aspect of the present invention there is provided a smoldering suppressing composition comprising a complex of a multivalent metal and ammonium superphosphoric acid, the composition containing $PO_4^{3-}$ in an amount of at least 60 weight percents of the total weight of the composition.

As used herein, the term "smoldering", also known in the art as "after flame burning", refers to a burning which continues after the open flame has been extinguished.

As used herein, the term "smoldering suppressant", which is also referred to herein, interchangeably, as a "smoldering suppressing" agent, compound, composition or formulation, describes a compound, a composition or a formulation, respectively, which is capable of reducing or eliminating the tendency of a substrate to burn after no longer being exposed to a flame.

As used herein, the phrase "superphosphoric acid", which is abbreviated herein as SPA, encompasses any mixture of orthophosphoric acid and polyphosphoric acid containing at least 82% $P_2O_5$, based on the common definitions for the constituents in polyphosphoric acid compositions described hereinabove. Preferably, the superphosphoric acid contains at least 83% $P_2O_5$. These levels of $P_2O_5$ correspond to a superphosphoric acid containing up to 30% of orthophosphoric acid (for 82% $P_2O_5$), and to a superphosphoric acid containing up to 12% of orthophosphoric acid (for 83% $P_2O_5$), respectively (see, for example, Table 1 above).

The term "orthophosphoric acid", which is also known and referred to in the art and herein as monophosphoric acid, refers to $H_3PO_4$.

The term "polyphosphoric acid" refers to a compound having two or more atoms of phosphorus in a chain (also termed acyclic) or ring structure, in alternating sequence with oxygen. The empirical formula for the commonly used acyclic polyphosphoric acid is $H_{n+2}P_nO_{3n+1}$; when $n=2$, the species is commonly known as pyrophosphoric acid, while when $n=3$, the species is commonly termed tripolyphosphoric acid. For example, a polyphosphoric acid containing 79.7% of $P_2O_5$ would have the average formula $H_4P_2O_7$, but actually contains about 18% $H_3PO_4$, about 42% $H_4P_2O_7$, about 23% $H_5P_3O_4$, and about 17% higher polyphosphoric acids.

The term "metal complex" as defined herein, refers to a complex formed between the superphosphoric acid and one or more metal ions. Without being bound to any particular theory, it is assumed that the metal ions in the complex interact with negatively charged groups and/or other functional groups in the polyphosphoric acid structure.

To this effect, preferably, the metal is a multivalent metal, namely, having a valency greater than 1. As used herein and is well known in the art, valency is defined as the number of electrons in a substance that can be used to interact, via overlap of electron orbitals, with other substances.

According to preferred embodiments of the present invention, the multivalent metal is preferably a divalent metal or a trivalent metal.

Exemplary divalent metals, include, but are not limited to, calcium, copper, iron, magnesium, manganese, zinc, and cobalt.

Preferably, the divalent metal is calcium.

Exemplary trivalent metals, include, but are not limited to, aluminum and iron.

Preferably, the trivalent metal is aluminum.

In Schemes 3 and 4 below, possible chelation mechanisms are presented for different metal ammonium superphosphate complexes, according to preferred embodiments of the present invention.

Scheme 3 below presents a proposed illustration of the interactions between $Ca^{+2}$ ions and two polyphosphate chains in preferred metal complexes described herein, which form a 3D network, and, without being bound to any particular theory, may explain the reduced solubility of the product. It should be noted that the n distribution or average is unknown.

Scheme 3

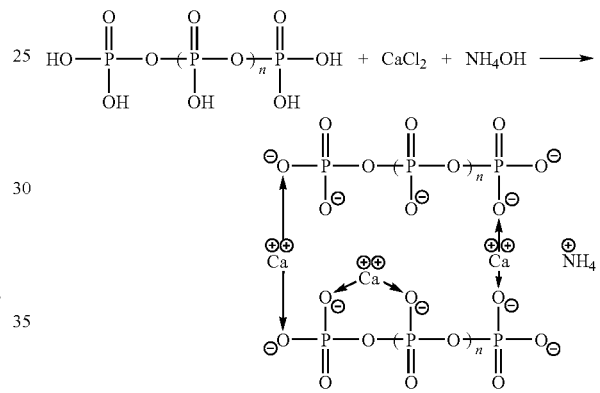

Similarly, Scheme 4 below presents a proposed illustration of the interactions between $Al^{+3}$ ions and several polyphosphate chains, forming a 3D network composed of phosphate, diphosphate, and multiphosphate components, interconnected via aluminum ions. Again, without being bound to any particular theory, this network may explain the reduced solubility of the product. It should be noted that the n distribution or average is unknown.

Scheme 4

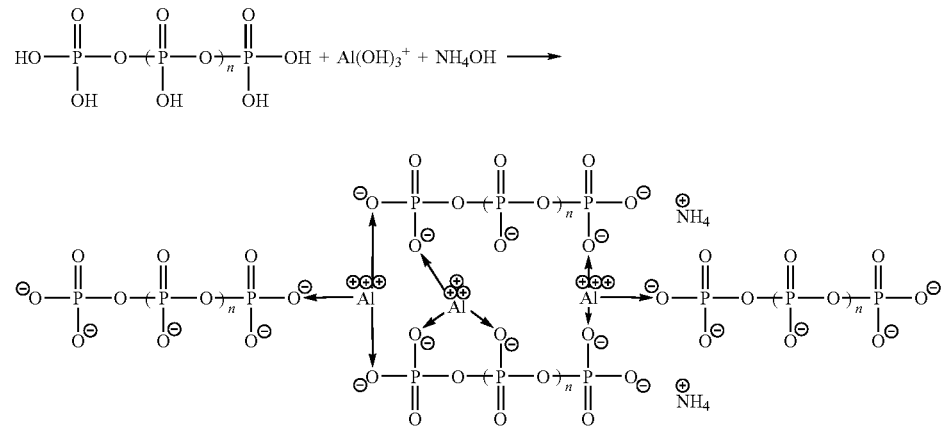

As demonstrated in the Examples section that follows, complexes of a multivalent metal and an ammonium superphosphoric acid, having a $PO_4^{3-}$ content of 60 weight percents or more have been successfully prepared. Thus, for example, calcium ammonium superphosphate complexes containing from 60 weight percents to 70.6 weight percents $PO_4^{3-}$ (see, for example, Table 3 in Example 1 and Table 4 in Example 2) and aluminum ammonium superphosphate complexes containing from 73.2 weight percents to 77.7 weight percents $PO_4^{3-}$ (see, for example, Table 6 in Example 5) were successfully prepared.

As a comparison, currently known metal ammonium polyphosphate complexes contain from about 3 weight percents to about 60 weight percents $PO_4^{3-}$ (3.3-22 weight percents by Lapina and Grishina (1973), 47.6 weight percents by Rilo and Turchin (1975) and 57.9 weight percents by Frazier and Taylor (1956), all cited supra).

Thus, a smoldering suppressing composition, according to the present embodiments, contains $PO_4^{3-}$ in an amount higher than 60 weight percents, preferably higher than 70 weight percents and even higher than 75 weight percents.

The smoldering suppressing compositions can therefore contain $PO_4^{3-}$ in an amount of 61 weight percents, 62 weight percents, 63 weight percents, 64 weight percents, 65 weight percents, 66 weight percents, 67 weight percents, 68 weight percents, 69 weight percents, 70 weight percents, 71 weight percents, 72 weight percents, 73 weight percents, 74 weight percents, 75 weight percents, 76 weight percents, 77 weight percents, 78 weight percents, 79 weight percents, 80 weight percents and even higher.

As discussed in detail hereinbelow, the compositions described herein are preferably solid or semi-solid compositions. As described in the Examples section that follows, the phosphate content in the compositions described herein was determined based on measurements of a solid portion of the obtained compositions, which is presumably consisted of the metal ammonium superphosphate complex formed. Hence, it is suggested that the metal ammonium superphosphate complexes described herein contain a phosphate content in an amount higher 60 weight percents of the total weight of the complex.

As further demonstrated in the Examples section that follows, the smoldering suppressing compositions containing such a high phosphate content were applied on various fabrics, optionally in combination with different flame retardants, and were shown to render these fabrics smoldering suppressing and flame retarding even after continuous washings thereof (see, Examples 14-22 hereinbelow). Furthermore, while, as discussed hereinabove, continued washings is expected to slowly dissolve some of the coating on the fabric, thus lowering the smoldering suppressing efficacy, in some samples, higher smoldering suppressing activity was observed as the number of washing cycles increased (see, for example, Example 21 hereinafter).

Without being bound to any particular theory, it is suggested that such a high phosphate content in the compositions and/or complexes described herein results from the presence of long chain polyphosphates in the complexes, whereby the latter is attributed to the use of long-chain polyphosphates, such as those present in a superphosphoric acid, as defined herein, in the preparation of the metal ammonium phosphate complexes.

Hence, according to preferred embodiments of the present invention, the superphosphoric acid forming the complexes described herein comprises at least 82 weight percents of $P_2O_5$, preferably at least 83 weight percents of $P_2O_5$.

Further according to preferred embodiments of the present invention, the superphosphoric acid forming the complexes described herein comprises less than 35 weight percents of pyrophosphoric acid, preferably less than 30 weight percents, more preferably less than 25 weight percents, more preferably less then 20 weight percents and more preferably less than 15 weight percents of pyrophosphoric acid.

As discussed in detail hereinafter, it has been found that such a low content of pyrophosphoric acid advantageously affects the properties of the composition.

As further demonstrated in the Examples section that follows, it has been surprisingly found that the physical state of a multivalent metal complex that is formed by reacting ammonium phosphates and multivalent metal salts (e.g., crystalline solid or amorphous gel) depends, inter alia, on the type of phosphoric acid used. Thus, it was found, for example, that while calcium complexes formed with ammonium salts of monophosphoric acid or various polyphosphoric acids are crystalline, water-insoluble complexes, calcium complexes formed with ammonium superphosphoric acid are obtained as amorphous gels (see Example 1, hereinbelow).

As is demonstrated in the Examples section that follows, the advantageous use of amorphous gel compositions in smoldering suppressing formulations, as compared with crystalline calcium ammonium phosphate or polyphosphate salts, is reflected by the superior anti-smoldering and washing fastness performance of the gel compositions. As demonstrated in the Examples section which follows, the flame retarding and smoldering suppressing properties, as well as the washing fastness, of gel-containing formulations were compared with those of formulations containing the crystalline $CaNH_4PO_4$ (prepared from a monophosphoric acid) (see, for example, Table 17, sample 6). When a formulation containing the $CaNH_4PO_4$ along with a FR dispersion was applied to a textile fabric, unsatisfactory results were obtained due to failure in the after glow test (264 seconds). It was further shown that $CaNH_4PO_4$ was washed off the fabric due to abrasion during laundry. As further demonstrated in the Examples section which follows, crystalline CaADP did not yield a washing fastness and anti smoldering effect at all, whereby the amorphous CaASP proved to be a durable smoldering suppressing composition (see, for example, Example 14).

It is suggested that the amorphous nature of the gel compositions described herein may contribute to the formation of a non-brittle film together with a binding agent. This flexible film is apparently responsible for the washing fastness of the composition when applied to textiles. It is further believed that the amorphous state of the composition is compatible with the aggregation phase of FR formulations, thus penetrating the fabric more efficiently, thereby forming a stable layer which adheres well both to the fabric and to the binder, providing a washing-fast smoldering suppressing composition.

Thus, according to a preferred embodiment of the present invention, the smoldering suppression composition described herein is in a form of a gel.

The term "gel", as used herein and is well accepted in the art, describes a semi-solid composition. This term further encompasses compositions including a solid network that encages a liquid phase therewithin.

Hence, further according to preferred embodiments of the present invention, the gel compositions described herein further comprise an aqueous solution.

The gels described herein are preferably advantageously characterized as being in an amorphous form.

The term "amorphous", as used herein and is well accepted in the art, describes the absence of crystallinity, or, in other words, a lack of a crystalline structure, as commonly defined in the art.

Obtaining an amorphous gel composition only when using metal complexes of superphosphoric acid, as opposed to shorter polyphosphoric acids having lower content of $P_2O_5$ and a higher content of the ortho- and pyro-phosphoric acids, is further supported by the teachings of Philen (cited supra). Philen has shown that forming calcium complexes of short-chain APP did not result in a gel, but rather in what is referred to in this document as a "primary suspending agent" $Ca(NH_4)_2 P_2O_7 \cdot H_2O$, having crystals smaller than about 50 microns.

As demonstrated in the Examples section that follows, it has been demonstrated that calcium complexes prepared from ortho and pyrophosphoric acids do not yield gels, but rather crystalline particles. Evidence for this feature were obtained by X-ray crystallography (see, Example 1 in the Examples section that follows) and by images of non-crossed polars (FIG. 2A) and of crossed polars (FIG. 2B) of the products. In contrast, the CaASP gel prepared from superphosphoric acid has been confirmed to be completely amorphous in the X-ray crystallography results (Example 1), and by the images of non-crossed polars (FIG. 1A) and of crossed polars (FIG. 1B) thereof.

In addition to the advantageous smoldering suppressing properties of the gel compositions of the present embodiments, these gel compositions were further characterized by physical properties that render these compositions highly convenient to store, handle and use in coating applications. For example, exemplary gel compositions (e.g., CaASP, CaASP*, and AlASP** gels) were obtained as free flowing gels, and were further characterized by a viscosity that ranges from about 100 centipoises to about 500 centipoises.

According to some of the presently most preferred embodiments, the viscosity of these compositions ranges from about 200 centipoises to about 300 centipoises, thus rendering the gels suitable for applications demanding a thin and even coating on the substrate, such as in textile applications. Furthermore these gels were further characterized as being smooth, not having a gritty feel upon applying a coating thereof on a fabric.

Surprisingly, as is further shown in the Examples section that follows, the gel compositions of the present embodiments have been demonstrated to keep their smoldering suppressing and flame retardant properties, as well as other physical properties, upon drying the gels to obtain powders and then re-dispersing the powder in an aqueous solution. Thus, for example, when a dried CaASP* gel was incorporated in a formulation along with a decabromodiphenyloxide (DECA) FR dispersion, the formulation proved to be just as effective, compared to the original gel, after the same number of washing cycles (5): the after-flame time remained 0 seconds, the after-glow time slightly increased, from 70 seconds to 82 seconds, and the char length actually decreased from 16 centimeters to 14 centimeters (see, for example, Tables 22 and 23 in Example 19). Yet further, AlASP gel compositions were exclusively made from powders of the original gels, while maintaining excellent SS and FR properties (after flame time of 0 seconds in all samples, an after-glow time of 16-75 seconds, and a char length of 13.6-14.6, see Examples 20-22).

The ability of such dry powders to be effectively and successfully used in forming SS and/or FR compositions, is highly advantageous to manufacturers and users, in terms of handling, storage and use.

Hence, according to preferred embodiments of the present invention, there is provided a composition as described hereinabove, which is in a dry powder form.

Preferably, the dry powder form is uniquely characterized as being a gellable powder, namely, as being capable of re-forming a stable gel upon contacting an aqueous solution.

Thus, as exemplified in the Examples section below, the multivalent metal ASP gel compositions described herein may be advantageously dried, stored in a powder form, and then reform gel compositions upon addition of an aqueous solution (see, for example, Table 5 in Example 2 for CaASP, and Examples 5 and 10-12 for AlASP). These powders were further characterized as being free-flowing and were shown to remain as such, while not forming aggregates ("caking") also upon being subjected to prolonged (one month) pressure and high temperature (see, for example, Example 5 hereinbelow). Thus, these powders can be conveniently stored for prolonged time periods, for future use, without being prone to "caking" and/or lose their applicability, smoldering suppressing and/or flame retardant properties.

As exemplified in the Examples section below, any of the multivalent metal ASP compositions described herein are characterized by high storage stability, being stable for at least two weeks at about room temperature, and often being stable for four weeks and even longer periods. As demonstrated in Example 1 hereinbelow, an exemplary CaASP gel was left on shelf at ambient temperature for approximately two months and remained stable during this period, necessitating only slight agitation to resume the gel state.

It was further shown that these formulations are stable for at least one week when stored at elevated temperatures (e.g., above 30° C., or by following the "Tropical Storage Test", at 54° C.). It is to be understood that at temperatures below room temperature, the stability of the above-described formulation is even higher than these values.

As further shown in the Examples section that follows, smoldering suppressing compositions, either as gels or as dry powders, were successfully prepared while utilizing a variety of metals, counter ions, and reaction conditions.

Therefore, according to another aspect of the present invention there is provided a process of preparing any of the gel compositions described herein. The process, according to this aspect of the present invention, is effected by simply mixing the superphosphoric acid, a salt of a multivalent metal and ammonia, preferably in an aqueous solvent.

Multivalent metal salts containing a variety of counter ions can be used as reagents in this process. Exemplary salts include, but are not limited to, carbonates, chlorides, bromides, fluorides, silicates, hydroxides, acetates, ascorbates, gluconates, lactates, nitrates, propionates, sulfates, anhydrous sulfates, sulfate hemihydrates, sulfate dihydrates, di-maleate trihydrates, tartrates, malonates, succinates, glycerophosphates, sulfites, bisulfides, bisulfites, bisulfates, chlorates and hypochlorites.

As demonstrated in the Examples section that follows, the type of the multivalent metal, as well as the counter ion (the anion), used in the preparation of the complex, can affect the physical state of the complex (see, for example, Examples 1, 2, 3, 4 and 5) and in some cases its smoldering suppressing properties.

According to preferred embodiments of the present invention, the multivalent metal is calcium and the salt is a chloride salt, a carbonate salt or a hydroxy salt. Preferably, this salt is a carbonate salt.

Further according to preferred embodiments of the present invention, the multivalent metal is aluminum and the salt is a chloride salt, a carbonate salt or a hydroxy salt. Preferably, this salt is a hydroxy salt Al(OH)$_3$.

The term "ammonia" as used herein refers to NH$_3$, which, in aqueous solution is present as the ammonium ion NH$_4^+$.

In the course of studying and optimizing the conditions for preparing stable gel compositions of multivalent metal ASP complexes, it was further found that obtaining a stable gel composition of multivalent metal can be sensitive to pH conditions, with basic pH resulting in improved composition. Thus, according to another embodiment of this aspect of the present invention, the process is conducted under basic pH conditions, such that mixing the reagents is performed while maintaining a pH of the solution higher than 7.

It should be further noted, that while the preparation of some aluminum ammonium phosphates have been described in the art, the present inventors have now devised a novel process for preparing aluminum ammonium phosphate complexes, particularly those described herein, which is far superior to previously reported processes.

Thus, while known processes for the preparation of aluminum ammonium phosphates involve either a very long process at ambient temperatures, often measured in weeks (!) (see, for example, Frazier and Taylor (1956)), or very high temperatures, reaching 150° C., 250° C. and even 350° C. (see, for example, Rilo and Turchin (1975)), it was surprisingly found that by conducting the reaction at a temperature in the range of 55-150° C., an amorphous aluminum ASP complex was formed, which exhibited the desired SS composition properties, as discussed in great detail hereinabove. This process was conducted for less than 5 hours and even less than 2 hours (see Examples 10-12 hereinbelow). Without being bound to any particular theory, it is suggested that such mild conditions are allowed due to utilizing aluminum hydroxide as a starting material, instead of alumina, as previously taught in the art.

As discussed hereinabove, performing the process described herein in an aqueous solvent typically and advantageously results in formation of a gel. As further discussed hereinabove, such a gel may conveniently be dried, so as to obtain a powder.

Thus, optionally, the process described herein further comprises drying the obtained composition, to thereby obtain a dry powder.

As demonstrated in the Examples section which follows (see, for example, Table 5) various drying cycles were studied under various drying conditions, showing that the drying time, drying temperature and reduced pressure can be selected as desired without harming the final gel structure. Thus, the powder can be obtained by slow drying at room temperature over a few days, or by drying under reduced pressure for a shortened time period (e.g., 1 or 2 days). Conveniently, low heat (under 100° C.) may be applied, with or without applying reduced pressure, and even higher temperatures (250° C. in an oven, or directly on a hot plate) can be applied, for short periods of time without adversely affecting the appearance and feel of the gel.

The drying can further be effected by various drying techniques, commonly used in the art. These include, for example, spray drying and paddle drying.

When utilized for application on a substrate, a smoldering suppressing composition as described herein is preferably incorporated in a smoldering suppressing formulation, which preferably further comprises a carrier.

Thus, according to another aspect of the present invention there is provided a smoldering suppressing formulation comprising any of the compositions described hereinabove.

The formulations described herein can further comprise additional ingredients that may stabilize the formulation, prolong its shelf-life and/or provide it with other desired properties such as certain viscosity, homogeneity, stability and adherence to the substrate.

Exemplary additives include, but are not limited to, surface active agents, wetting agents, dispersing agents, suspending agents, antifoaming agents, preservatives, stabilizing agents, binding agents, thickening agents and any mixture thereof.

The surface active agent and/or wetting agent can be both nonionic and/or ionic (anionic and/or cationic) agents.

Examples of nonionic agents that are suitable for use in the context of the present invention, include, but are not limited to, polyoxyethylene (POE) alkyl ethers, preferably NP-6 (Nonylphenol ethoxylate, 6 ethyleneoxide units) such as DisperByk® 101.

Examples of anionic agents that are suitable for use in the context of the present invention include, but are not limited to, free acids or organic phosphate esters or the dioctyl ester of sodium sulfosuccinic acid.

Examples of dispersing agents and/or suspending agents that are suitable for use in the context of the present invention, include, but are not limited to, acrylic acids, acrylic acids ester copolymer, neutralized sodium polycarboxyl, preferably naphthalene sulfonic acid-formaldehyde condensate sodium salt, alginates, cellulose derivatives and xanthan.

Examples of defoaming and/or antifoaming agents, that are suitable for use in the context of the present invention, include, but are not limited to, mineral oil emulsions, natural oil emulsions, and preferably silicon oil emulsions, such as AF-52™.

Examples of preserving or stabilizing agents, that are suitable for use in the context of the present invention, include, but are not limited to, formaldehyde and alkyl hydroxy benzoates; preferably the preserving or stabilizing agent is a mixture of methyl and propyl hydroxy benzoates.

Additionally, a salt (e.g., ammonium phosphate or a borate) or an oxide (e.g., sodium silicate, alumina oxide, alumina oxide, aluminum hydrate) and any mixture thereof, may be added to the formulations of the present invention.

Further, co-polymers derived from brominated and non-brominated monomers, such as, for example, those described in WO 05/070980, which is incorporated by reference as if fully set forth herein, can be advantageously added to the formulation. Such co-polymers were found effective in improving the flame retardancy properties. Preferably, the brominated co-polymer is a brominated polyacrylate.

According to preferred embodiments of the present invention, the formulation described herein further includes a binding agent (also referred to herein interchangeably as "binder") which increases the adhesion of the SS composition or formulation to the substrate.

The binder used in the formulations described herein is selected to be compatible with the smoldering suppressants as well as with additional additives and substances in the formulation, and is further selected depending on the specific application. For example, different binders may be suitable to attach the SS formulation described herein to wood, plastic or textile. The binder can thus be selected from a large variety of suitable materials, including, but not limited to, synthetic polymers, such as styrene-butadiene (SBR) copolymers, carboxylated-SBR copolymers, melamine resins, phenol-aldehyde resins, polyesters, polyamides, polyureas, polyvinylidene chloride, polyvinyl chloride (PVC), acrylic acid-methylmethacrylate copolymers, vinyl acrylate copolymers, acetal copolymers, polyurethanes, and mixtures and cross-linked versions thereof.

Representative examples of binders that are suitable for use on textiles include, without limitation, acrylates, polyurethanes, and PVC. Preferably, the binder used in the formulations described herein is an acrylate.

Examples of acrylates that are suitable for use in the context of the present invention, include, but are not limited to, copolymers of acrylates, such as methyl acrylate, ethyl acrylate, butyl acrylate, styrene, and others.

As is shown in the Examples section which follows, the formulations of the present embodiments were well adhered to the substrates, and thus the treated substrates maintained their durability, in terms of washing fastness, while further maintaining the smoldering suppressing properties thereof.

According to preferred embodiments of the present invention, the formulation described herein further comprises at least one flame retardant, hence forming a smoldering suppressing and flame retardant formulation.

As used herein, the term "flame retardant", which is also termed herein, interchangeably, as "fire retardant", "flame resistant" and "fire resistant", describes a compound, a composition or a formulation which is capable of reducing or eliminating the tendency of a substance to ignite when exposed to a low-energy flame.

The flame retardant added to the smoldering suppressant formulations described herein, can be either a halogenated flame retardant, or a non-halogenated flame retardant. Preferably, in cases where the formulation is intended to be applied on a textile fabric, the flame retardants are selected suitable for use on textiles, as detailed in the background section hereinabove.

Examples of such suitable flame retardants include, but are not limited to, brominated flame retardants, chlorinated flame retardants, acrylics, polyhaloalkenes, organophosphorus compounds, melamine, polyaramides, carbonized acrylics and glass. Preferably, the additional flame retardant is selected from brominated and chlorinated flame retardants. Examples of particularly preferred additional flame retardants, which are sometimes also known as a smoldering suppressants, are tetrabromobisphenol A-bis(2,3-dibromopropyl ether) (also referred to herein as FR-720), decabromodiphenyloxide (DECA), hexabromocyclododecane (HBCD) and pentabromobenzylbromide (PBBBr).

PBBBr formulations, which are the subject of U.S. Provisional Patent Application 60/775,785, filed Feb. 23, 2006 and of U.S. patent application Ser. No. 11/709,726, by the present assignee, both incorporated by reference as if fully set forth herein, have been found to be an effective flame retardant for textile fabrics.

FR-720 is used as a flame retardant in textile formulations (mainly for back-coating on rich cotton upholstery textiles) as an alternative to the flame retardant HBCD. However, FR-720-containing formulations are often characterized by poor dispersability properties, which render their application onto textile inefficient.

The present inventors have developed a process of formulating FR-720 dispersions which yields a smooth and uniform FR-720 concentrate, with good dispersion properties. This concentrate was used for preparing a full textile formulation.

As demonstrated in the Examples section that follows, application of a smoldering suppressing and flame retarding formulation containing the FR-720 concentrate passed all flame retardancy tests (an after flame time of 0 seconds, an after glow time of 33 seconds, and a char length of 14 centimeters) even after 15 washing cycles (see, Example 24).

Thus, in some embodiments, FR-720, as a concentrate of a pre-milled aqueous dispersion thereof, is used in the formulation described herein.

The flame retardants added to the formulations can be used in a weight ratio from about 1:10 and 10:1 with respect to the smoldering suppressing composition. Preferably, the ratio ranges from about 1:5 and 5:1. Preferably, the flame retardant is in an amount which is either equal to or larger than the amount of the SS composition. For example, as is shown in Table 16 which follows, a formulation where the ratio between PBBBr and CaASP was 12.5:2.4 (5.2:1) exhibited high efficacy. Formulations containing 7:1, 3:1 and 1:1 PBBBr:CaASP ratios were also prepared. Other formulations, exhibiting different ratios, for example between PBBBr and MgASP (8:1 PBBBr:MgASP, Example 17), DECA and CaASP* or CaASP (DECA:CaASP 3:1 to 4:1 Examples 18-20), DECA and AlASP (Examples 20-22), also showed promising SS and FR properties.

Formulations comprising the SS compositions described herein and at least one flame retardant can be in the form of an aqueous dispersion. As described in detail in U.S. Provisional Patent Application 60/775,785, filed on Feb. 23, 2006 (supra), aqueous dispersions of certain FRs were found highly stable and efficient.

According to preferred embodiments of the present invention, formulations that comprise a flame retardant, may further comprise at least one fire retardant synergist, which acts in synergy with the FR (Lyons J. W. "the chemistry and uses of fire retardance" Wiley, N.Y. 1970 pp. 20-22), and thus enhances the flame resistance properties of the formulation.

An exemplary fire retardant synergist which is suitable for use in the context of the present invention is antimony oxide (AO), including, for example, $Sb_2O_3$ (antimony trioxide) and $Sb_2O_5$. However, as is detailed in the Background section hereinabove, when a FR formulation is applied on textiles, large amounts of AO are undesirable due to cost, toxicity, environmental concerns and increase in the total add-on.

In commercial products, elemental antimony to bromine (Sb:Br) ratios of 1:3 are common. As exemplified hereinbelow, this ratio was substantially reduced upon using an exemplary formulation according to the present embodiments. For example, it was possible to reduce the Sb:Br ratio in DECA/CaASP formulations to 1:5.4 (Table 20, DECA/CaASP sample 1), while actually decreasing the after-glow time (from 0.6 seconds to 0 seconds), decreasing the char length (from 16.5 centimeters to 13.7 centimeters), as compared to the 1:3 Sb:Br sample (Table 20, DECA/CaASP sample 2). In another set of examples in DECA/AlASP** formulations, the Sb content was gradually decreased from 1:3 to 1:6 to 1:14, while maintaining and even improving the excellent SS and FR properties: the after-flame time remained 0 seconds at all Sb ratios. The after-glow time decreased from 75 seconds to 20 seconds to 13.5 seconds, respectively, and the char length also decreased from 14.6 centimeters to 14 centimeters and 13.5 centimeters, respectively, although the samples have been subjected to multiple washings (as high as 30 washing cycles for the 1:6 ratio sample).

The formulations presented herein are therefore further advantageously characterized in that the need to use large amounts of a FR synergist such as AO is circumvented due to the relatively enhanced binding of the SS composition and/or the flame retardant to the substrate. Hence, lower amounts of a FR synergist, as compared to the presently known FR formulations, are required so as to maintain the desired efficient flame retardant properties and washing fastness.

In some embodiments, the formulations described herein comprise flame retardants that can be utilized without any FR synergist, thus reducing cost, toxicity, environmental concerns and the total add-on. Exemplary such flame retardants are compounds containing a labile bromine source, such as HBCD.

Thus, according to preferred embodiments of the present invention, the molar ratio between the synergist, if present, and the flame retardant in the formulations described herein preferably ranges from 1:1 to 1:50. Preferably, the molar ratio ranges from 1:3 to 1:25. More preferably, the molar ratio ranges from 1:3 to 1:15.

A process of preparing the smoldering suppressing and flame retardant formulations described herein is effected, for example, by mixing the smoldering suppressing composition or formulation and the flame retardant, and optionally with other components of the formulation, as described herein.

In some embodiments, the flame retardant is used as an aqueous dispersion thereof. The FR-containing aqueous dispersion is prepared (e.g., pre-milled) prior to its addition to the SS composition or formulation.

The smoldering suppressing compositions or formulations described herein can further be advantageously packaged in kits for smoldering suppressing applications.

Thus, according to another aspect of the present invention, there is provided a kit which comprises a packaging material and any of the smoldering suppressing compositions described herein or any of the smoldering suppressing formulations described herein, being packaged in this packaging material.

The term "kit" describes a package or container with ingredients for coating a substrate of the present invention, whether the ingredients are in separate containers or packages, or mixed together.

In one exemplary embodiment, the kit comprises a smoldering suppressing composition as described herein, in a gel form.

In another exemplary embodiment, the kit comprises a smoldering suppressing composition as described herein, in a powder form, to be mixed with an aqueous solution before the application on the substrate, to thereby form a stable and effective gel.

Such a kit can further comprise an aqueous solution, to be used for forming a gel upon contacting the powder composition. Preferably, the powder composition and the aqueous solution are individually packaged within the kit. Alternatively, such a kit can further comprise instructions, printed on an insert or on the packaging material, indicating how to form a gel from the packaged powder.

In still another exemplary embodiment, the kit comprises a formulation containing a SS composition in a powder form, mixed with a powdered flame retardant, and optionally further comprises an aqueous solution, as described herein.

Alternatively, a SS composition or formulation, as described herein and a flame retardant are individually packaged in the kit and pre-mixed before use.

The flame retardant may be either in a powder form, or as a dispersion in a solution, as described herein, and is packaged accordingly.

As further demonstrated in the Examples section that follows, the smoldering suppressing compositions described herein were found to serve as highly efficient smoldering suppressants upon application to substrates such as textiles, while maintaining the desirable aesthetical, textural properties as well as flame retardant properties of the fabric, even after extensive washing (see, for example, Examples 14-22). For example, a textile fabric treated with a formulation comprising the CaASP amorphous gel composition of the present embodiments, along with a PBBBr FR dispersion, passed all flame retardancy tests (an after flame time of 0.56 seconds, an after glow time of 38 seconds, and a char length of 14.6 centimeters) even after 25 washing cycles (see, Table 16 in Example 14). In another example, the AlASP amorphous gel composition of the present embodiments, along with a DECA FR dispersion, passed all flame retardancy tests (an after flame time of 0 seconds, an after glow time of 20 seconds, and a char length of 14 centimeters) even after 30 washing cycles (see, Example 21). Thus, the smoldering suppression and flame retardancy properties of the treated fabric were shown to be washing-fast.

Hence, according to another aspect of the present invention there is provided a process of applying any of the smoldering suppressant formulations described herein, to a substrate.

As used herein, the term "substrate" describes an article which has a surface that can be beneficially coated (either wholly or partially) with a smoldering suppressant formulation. Exemplary articles include, without limitation, textiles, wood, furniture, toys, bricks, electrical appliances, electrical cables, plastics and more.

Preferable substrates onto which the smoldering suppressant formulations described herein can be beneficially applied are textile fabrics. The textile fabrics can be synthetic, natural or a blend thereof. Non-limiting examples of textile fabrics that can be beneficially used in the context of the present invention include wool, silk, cotton, linen, hemp, ramie, jute, acetate fabric, acrylic fabric, latex, nylon, polyester, rayon, viscose, spandex, metallic composite, carbon or carbonized composite, and any combination thereof. Representative examples of textile fabrics which were shown to be suitable for use in the context of the present invention include, without limitation, cotton, polyester, and combinations thereof.

As used herein, the term "flammable substrate" describes a substrate, as described hereinabove, that easily ignites when exposed to a low-energy flame. The flammability of different substrates, or of articles-of-manufacture made of these substrates, is typically tested and determined according to international standards. Representative examples include ASTM D-1230, a standard test method for flammability of apparel textiles; ASTM D-4151, a standard test method for flammability of blankets; ASTM D-4723, a standard index of and descriptions of textile heat and flammability test methods and performance specifications; ASTM D-4804, a standard test method for determining the flammability characteristics of non-rigid solid plastics; ASTM D-6545, a standard test method for flammability of textiles used in children's nightwear; ASTM D-777, standard test methods for flammability of treated paper and paperboard; ASTM D-1317, a standard test method for flammability of marine surface finishes; ASTM D-1955, a standard test method for flammability of sleeping bags, and ASTM D-6413, a standard test method for flame resistance of textiles (vertical test).

The process, according to this aspect of the present invention, is effected by simply contacting the substrate with the smoldering suppressant formulation, whereby the contacting can be effected by any industrially acceptable manner. Optionally, subsequent to contacting the SS formulation, the substrate is heated to a temperature between 100° C. and 200° C., preferably about 160° C., whereby the temperature is dictated by the curing temperature of the binder. The industrially acceptable manner in which the contacting is effected includes, for example by spreading, padding, foaming and/or spraying the smoldering suppressant formulation onto the substrate. Padding is a process that is typically used for applying the formulation on a textile substrate and is defined as a process in which the fabric is first passed through a padder containing the SS formulation, and is then squeezed between heavy rollers to remove any excess formulation.

The process described herein can be effected, for example, either during the dyeing or during the finishing stages of the substrate manufacture.

As is demonstrated in the Examples section that follows, the formulations and processes described herein were practiced so as to provide substrates having the SS and/or FR formulation applied thereon. When the substrate is a textile substrate, it is characterized by enhanced after-flame and/or flame retardancy, while still maintaining its aesthetical and textural properties.

Using the process described herein, it was demonstrated, for example, that a bone-dry (as defined hereinafter the term "bone-dry" describes a substrate having zero percent moisture content) 100% Rib knitted cotton fabric which was padded with a PBBBr/CaASP dispersion, prepared according to preferred embodiments of the invention, passed ASTM D 6413 12 seconds ignition test with an after flame time of 0.56 seconds, an after glow time of 38 seconds, and a char length of 14.6 centimeters, even after being washed for 25 times (see, Table 16, Example 14). DECA/AlASP dispersions prepared according to Examples 10-12 were similarly padded on 100% knitted cotton fabric were shown to pass ASTM D 6413 12 seconds ignition test with an after flame time of 0 seconds, an after glow time of 16-75 seconds, and a char length of 13.5-14.6 centimeters, even after being washed for 30 times (Examples 20-22).

Thus, according to another aspect of the present invention there is provided an article-of-manufacture which comprises a flammable substrate and any of the smoldering suppressant formulations described herein, being applied thereon.

The article-of-manufacture is characterized by smoldering suppressive and/or flame retardancy properties.

The smoldering suppression and/or flame retardancy of the tested substrates were determined by methods acceptable in the industry, for example a 12 seconds ignition test, which is defined in ASTM D 6413, a test method used to measure the vertical flame resistance of textiles. Considering the results of the 12 seconds ignition test, a textile may be classified on a pass/fail basis, according to predetermined criteria, and varying with the application or use of the textile. For many purposes, a textile is considered to have failed the 12 seconds ignition test, if either its "after flame time" is longer than 3 seconds, or if its "after glow time" is longer than 100 seconds, or if its average "char length" exceeds 7 inches (17.8 cm) or an individual sample has a "char length" longer than 10 inches (25.4 cm). A fabric is considered to have superior flame retardancy if all of the above criteria are met.

Thus, as demonstrated in the Examples section which follows, most of the substrates having applied thereon the smoldering suppressing compositions described herein, have passed ASTM D 6413 12 seconds ignition test either before laundry, and after 1, 3, 5, 25 and even 30 laundry cycles.

According to a preferred embodiment of the present invention, an article-of-manufacture, as described herein, is characterized as passing an ASTM D 6413 12 seconds ignition test.

According to yet another preferred embodiment of the present invention, an article-of-manufacture is characterized by passing an ASTM D 6413 12 seconds ignition test, upon being subjected to at least 1 washing cycle, at least 5 washing cycles, at least 25 washing cycles and even at least 30 washing cycles.

"After-flame time" is defined herein and in the art as the time period during which the sample continues to burn after removal of the burner. This term reflects the flame retardancy effectiveness, whereby a value lower than 3 seconds in the 12 seconds ignition test, is often acceptable. More preferably, a value lower than 2 seconds, signifies good flame retardancy, and a value lower than 1 second signifies excellent flame retardancy.

"After-glow time" is defined herein and in the art as the time period during which the sample glows after the flame is extinguished. This term reflects the smoldering suppression effectiveness, whereby a value lower than 150 seconds in the 12 seconds ignition test, is sometimes acceptable. More preferably, a value lower than 100 seconds, signifies a good smoldering suppression.

"Char length" is defined herein and in the art as the distance from the edge of the fabric that was exposed to the flame to the end of the area affected by the flame. A char is defined as a carbonaceous residue formed as the result of pyrolysis or incomplete combustion. This term reflects the combined smoldering suppression and flame retardancy effectiveness, whereby a value lower than 25 centimeters in the 12 seconds ignition test, is acceptable. More preferably, a value lower than 17 centimeters signifies a good smoldering suppression and flame retardancy.

Thus, the articles-of-manufacture according to the present embodiments are characterized by an after flame time of 3 seconds and less, preferably of 2 seconds and less and more preferably of 1 second or less and even 0 seconds; an after glow time of 150 seconds or less, preferably 100 seconds or less and more preferably of 60 seconds or less, and less than 30 seconds; and a char length of 25 centimeters or less and preferably of 17 centimeters or less, most preferably 14 centimeters or less.

As is further demonstrated in the Examples section that follows, when the SS formulations of the present embodiments were applied onto a textile fabric, the flame resistance and suppressed smoldering of the fabric, as defined by the "after flame time", "after glow time" and "char length", was maintained even after the fabric was contacted with hot water and a detergent, while being subjected to one or more washing cycles, as defined by Standard Laboratory Practice for Home Laundering (AATCC technical manual/2001). In fact, the flame resistance and suppressed smoldering properties of textile fabrics treated with the multivalent metal ASP-containing described herein were maintained even after the treated fabric was subjected to 5, 10 and even 30 washing cycles.

Hence, it has been shown that the treated textile fabrics are further characterized by enhanced washing fastness.

The term "washing fastness", which is also referred to herein interchangeably as "washing durability" or "laundry stability", refers to the ability of a substrate treated with the CaASP-containing of the present embodiments, to maintain its characteristic flame resistance, suppressed smoldering and/or textural and/or aesthetical properties, after being subjected to one or more washing cycles, as defined by Standard Laboratory Practice for Home Laundering (AATCC technical manual/2001).

As is well acceptable, a textile is considered "durable" if it withstands five or more washing cycles without having remarkable change of a property thereof, whereby a textile is considered "semi durable" if it similarly withstands between one and 4 washing cycles. Thus, the substrates treated with the formulations of the present embodiments were characterized by a washing fastness of five washing cycles, often exceeding 10 washing cycles, 20 washing cycles and even exceeding 30 washing cycles. Hence, according to further embodiments of the present invention, the articles-of-manufacture described herein are characterized by washing fastness. This feature is particularly notable in view of the relatively low amount of the binder in the applied formulation.

Thus, according to a further embodiment of the present invention, the "after flame time", "after glow time" and "char length" properties, as defined hereinabove, of an article-of-manufacture having the SS formulation described herein applied thereon remain substantially unchanged upon subjecting the article-of-manufacture to one or more washing cycles, and upon subjecting the article-of-manufacture to 5, 10, 20, 25 and often for 30 or more washing cycles.

As used herein the term "substantially unchanged" refers to a change of less than 30%, preferably less than 20%, and more preferably less than 10% in the tested property.

As is further demonstrated in the Examples section that follows, it has been shown that upon applying the SS formulations described herein onto textile substrates, the substrates maintained other textural and aesthetical properties. Thus, it has been shown that textile substrates coated with the CaASP formulation described herein were characterized by feel and appearance similar to those of a non-treated flammable substrate. Thus, for example, properties such as the flexibility, smoothness and streak-free look of a non-treated textile were maintained upon application of the SS formulation. Furthermore, these textural and aesthetical properties were maintained also upon subjecting the treated fabrics to several washing cycles.

Hence, according to another embodiment of the present invention, the article-of-manufacture described herein is further characterized by at least one aesthetical or textural property which is substantially the same as that of the flammable substrate per se.

The phrase "flammable substrate per se" as used hereinafter, refers to a flammable substrate which was not treated with the SS formulation.

As a result, articles of manufacture, and particularly textile substrates, treated by the formulation described herein have superior properties compared with the presently known SS and/or FR-treated products.

Exemplary articles-of-manufactures according to the present embodiments include any industrial product that comprises one or more flammable substrates and hence application of the SS formulation described herein thereon is beneficial. Such articles-of-manufacture include, for example, textiles, wood, furniture, toys, bricks, electrical appliances, electrical cables, plastics and more.

According to the presently most preferred embodiments of the present invention, the article-of-manufacture described herein comprises a flammable textile fabric.

The textile fabrics utilized according to embodiments of the present invention may be used as a single layer or as part of a multi-layer protective garment.

A textile substrate may be incorporated in various articles-of-manufacture, where it is desired to reduce the substrate flammability and/or smoldering. Such products include, for example, draperies, garments, linen, mattresses, carpets, tents, sleeping bags, toys, decorative fabrics, upholsteries, wall fabrics, and technical textiles. Technical textiles are textiles used in industrial, automotive, construction, agricultural, aerospace, hygiene and similar applications.

As discussed in the Background section hereinabove, textile flammability and textile smoldering are major concerns since textiles are used in all fields of life. Some textile articles of manufacture, such as garments, linen and some decorative or technical textiles, are subject to harsh usage (abrasion, exposure to various environmental conditions etc.) and therefore may need extensive, sometimes daily, cleaning and washing. So far, fire proofing these articles of manufacture involved either using the few available non-flammable fabrics; coating flammable fabrics with large amounts of FR, thus often damaging the fabric properties; or applying low amounts of FR on the flammable fabric, but limiting its cleaning method to the expensive and burdensome dry cleaning method. Using the SS formulation presented herein, these garments or technical textiles may be fire and smolder proofed while maintaining the feel and look of the fabric, as a result of applying relatively small amounts of the formulation. Other types of articles-of-manufacture, such as draperies, carpets, tents, sleeping bags, toys, wall fabrics, decorative fabrics, mattresses and upholsteries, are not washed as much as garments or linen. However, the major hazards that can be caused by the inherent flammability and smoldering of these articles call for efficient fire proofing thereof, in addition to their durability during periodic cleaning. These articles of manufacture may easily be made fire and smolder proof, either by using a fabric treated by the formulation described herein during the manufacturing process, or by easily applying these formulations onto the final product.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples which, together with the above descriptions, illustrate the invention in a non limiting fashion.

Materials and Analytical Methods

Materials:

$H_3PO_4$ (CAS 7664-38-2) and ammonium hydroxide 22% (CAS 1336-21-6) were obtained from Biolab, Jerusalem.

Aluminum hydroxide hydrate (MW=96, CAS No. 1330-44-5) was obtained from Sigma, Batch #034K3647.

Ammonium hydroxide 26% AR (MW=35.05, density 0.904 g/cm$^3$, CAS 1336-21-6) were obtained from Gadot, Batch #83017737-2121.

Pyrophosphoric acid (CAS 2466-09-3) was obtained from RIEDEL-DE-HAEN.

Superphosphoric acid (SPA) (CAS 8017-16-1) 115% (being equivalent, according to the manufacturer, to 82.5% to 83.5% by weight of $P_2O_5$) was obtained from ALDRICH, from MERCK (having 85% by weight of $P_2O_5$, according to the manufacturer) and from Riedel-de Haen (having at least 83% $P_2O_5$ by weight of $P_2O_5$, lot 52310, density 2.06 g/cm$^3$, according to the manufacturer). The superphosphoric acid molecular weight distributions were not reported by the manufacturers.

Decabromodiphenyloxide (DECA, CAS 1163-9-5) and PBBBr granules, having an average particle size of $d_{50}$=98 microns were obtained from ICL-IP.

Calcium chloride was obtained from MERCK.

Calcium carbonate was obtained from Negev Minerals.

Cellosize HEC QP-100MH (thickener) and Triton reagent were obtained from DOW.

Antimony trioxide (AO, CAS No. 1309-64-4) was obtained from Campine Belgium.

AC-200 W binder and GP acrylic thickening agent were obtained from B. G. Polymers.

Instrumental Data:

Optical Microscope Micrographs were obtained using a Nikon eclipse model ME600 with a Nikon optics ×100 lens.

The presence or absence of crystals has been recognized by examining the area between crossed polars: dots indicate crystals growth, whereby a completely dark field between crossed polars indicates that no crystals exist in the tested specimen.

Crystal structure was further determined by using an X-ray difractometer Ultima+ (RIGAKU).

Viscosity was determined using a Brookfield viscometer, model-LVTD spindle 2 RPM 60.

Metal content was determined using an atomic absorption spectrophotometer (SPECTRA AA400, VARIAN).

Nitrogen concentration (% N) was determined using a Kjeldahl nitrogen apparatus, (BUCHI). $NH_4^+$ concentration was calculated from the nitrogen concentration by multiplying % N by 18/14. Thus, 5% N is equivalent to 6.4% $NH_4^+$.

Phosphorus concentration (% P) was determined using an ICP VISTA AX VARIAN. $PO_4^{3-}$ concentration was calculated from the phosphorus concentration by multiplying % P by 95/31. Thus, 5% P is equivalent to 15.3% $PO_4^{3-}$.

Water content was calculated based on a Loss on Drying (LOD) method.

Add-on was calculated based on a weighing average, with a deviation of ±1%.

Application on Fabric:

Smoldering suppressant formulations prepared as described hereinbelow were padded on a chosen fabric. Curing and fixation were performed at 160° C. The percentage of additives on the fabric was determined by the difference between sample weight before and after application of the smoldering suppressant formulation.

Flammability Tests:

ASTM D 6413 12 seconds ignition test: In this method, samples are cut from the fabric to be tested, and are mounted in a frame that hangs vertically from inside the flame chamber. A controlled flame is exposed to the sample for a specified period of time (in this case for 12 seconds, one of the strictest flammability tests), and the "after-flame time" and the "after-glow time" are both recorded. Finally, the sample is torn by use of weights and the char length is measured. To pass, the average char length of five samples cannot exceed 7 inches (17.8 cm). In addition, none of the individual specimens can have a char length of 10 inches (25.4 cm). The sample is further classified as passing the test if its "after flame time" is less than 3 seconds, and its "after glow time" is less than 150 seconds, so as to render the sample applicable even in the stricter "children's nightwear" flammability standards.

Washing Fastness Tests:

Samples treated with the smoldering suppressant formulations described herein were subjected to 1-50 successive washing cycles in accordance with the washing procedure set forth below, followed by one drying cycle in accordance with commonly used drying procedure, based on the Standard Laboratory Practice for Home Laundering (AATCC technical manual/2001).

In all washing cycles, the temperature of the washing water is maintained between 58° C. and 62° C., for automatic washing machines, the washing cycle is set for normal washing cycle, and a synthetic detergent that conforms to Standard Laboratory Practice for Home Laundering (AATCC technical manual/2001) is used.

Aggregation Tests:

In order to determine aggregation behavior of smoke suppressant and/or flame retardant powders, aggregation tests are conducted under temperature and pressure conditions.

In a typical experiment, a metal cylinder is loaded with a 50-150 grams powder sample. A 4.5 Kg weight is placed on top of each sample creating a static pressure of about 0.12 atmospheres. The cylinder is placed in an oven at 50° C. for a period of one month, and is thereafter unloaded and the powder is visually examined.

Example 1

Preparation of Calcium Ammonium Phosphate Compositions from $CaCl_2$

General Procedure: Calcium ammonium phosphate compositions were prepared using various compositions of phosphoric acids as the starting materials, according to the general procedure outlined below:

Phosphoric acid and $NH_4OH$ (22% in water) were simultaneously added, while maintaining a pH of about 9, to a mechanically stirred, ice-cooled solution containing water and $CaCl_2$, keeping the temperature at about 10-20° C. during the reaction. During the addition, the pH was kept around 8.5 by adding $NH_4OH$, reaching about 8 at the end of the addition. The reaction mixture was thereafter stirred for 1 hour at 20° C.

Alternatively, the reaction mixture was stirred for 1 hour at 5° C.

Based on the general procedure described hereinabove, several compositions were prepared as follows:

Preparation of Calcium Ammonium Monophosphate ($CaNH_4PO_4$):

The process described in the general procedure above, was modified by first mixing the orthophosphoric acid and the calcium chloride. Thus, 85% $H_3PO_4$ (14 grams) was slowly added to water (60 grams) at 20° C. $CaCl_2$ (13 grams) was added slowly to the reaction vessel and an exothermic reaction was observed. $NH_4OH$ (22 grams, 22% in water) was added stepwise to obtain a pH 9, and the reaction mixture was stirred for half an hour. The product was obtained as a semi crystalline suspension. Particle size analysis indicated particles having an average size of $d_{50}=67$ µ. After wet grinding using a ball mill, an additional particle size analysis indicated particles having an average size of $d_{50}=4$ µ. The solids percentage, after washing the excess chloride salts, was determined to be around 18% by weight.

Preparation of Calcium Ammonium Di-phosphate (Pyrophosphate) (CaADP):

The process described in the general procedure above was repeated starting from diphosphoric acid (pyrophosphoric acid).

A semi crystalline suspension was obtained, as indicated by numerous micron scale crystals visible in the dark field between crossed polars (FIG. 2). The solids percentage, after washing the excess chloride salts, was determined to be around 14.5% by weight.

Preparation of Calcium Ammonium Superphosphate (CaASP):

The process described in the general procedure above, was repeated starting from superphosphoric acid (SPA) containing 115% $H_3PO_4$. The final product was obtained as a free flowing gel which appeared in one-phase and was stable for at least two months without any distinct phase separation. During this time period, a slight "perspiration" was occasionally observed, but brief mixing restored a uniform gel. The gel was obtained in both processes described in the general procedure (at 20° C. and at 5° C.). The solids percentage, after washing the excess chloride salts, was determined to be around 16% by weight. The viscosity of the product was determined to be between 200 to 300 cps.

The gel was separated into a solid fraction and a solution (filtrate) by filtration, the solid fraction was washed with water and each fraction was analyzed for $Ca^{2+}$, $NH_4^+$, $Cl^-$ and $PO_4^{3-}$. The compositions of the product, the filtrate and the washing solution are summarized in Table 3, below.

TABLE 3

| State | Weight Percentages | | | | |
|---|---|---|---|---|---|
| | $NH_4^+$ | $Ca^{2+}$ | $PO_4^{3-}$ | $Cl^-$ | $H_2O$ |
| Solid fraction | 9.5 | 19 | 60 | 11.5 | |
| Filtrate | 4.4 | 0.033 | 0.25 | 8.2 | 86.8 |
| Washing solution | 1.15 | 0.013 | 0.12 | 2.1 | 96.6 |

During any of the above described procedures, it was noted that even a slight change in conditions, for example, the dilution of the gel by water, causes an intense collapse of the gel structure and formation of crystals with an average size of $d_{50}=30$ microns. After filtration and drying, 16% by weight of dry solids are achieved.

In order to clearly determine the nature of the gel structure, the process was further repeated, comparing the gel obtained when starting from super-phosphoric acid containing 115% $H_3PO_4$ and the gel obtained when starting from pyrophosphoric acid. Each gel was placed under crossed polar to detect presence of crystals. As is shown in FIGS. 1 and 2, these figures clearly demonstrate that the gel obtained from pyrophosphoric acid was semi-crystalline (FIG. 2), whereby the CaASP gel, obtained from superphosphoric acid was confirmed to be non crystalline, as indicated by a completely dark field between crossed polars (FIG. 1). The same was observed after the gel had been standing on shelf for three months.

X-ray crystallography analysis and elemental analysis were performed to further confirm the amorphous nature of CaASP. These results are presented in FIG. 3 and FIG. 4 and demonstrate that the product, obtained from superphosphoric acid had a completely amorphous structure (with only a fingerprint of the ammonium chloride crystals, FIG. 4). In contrast, the gel obtained from pyrophosphoric acid was highly crystalline, comprising well-dispersed micro-crystals (FIG. 3).

Furthermore, a dry powder of the CaASP gel was prepared by filtering the CaASP gel prepared hereinabove, and drying the obtained solid overnight in a vacuum oven at 60° C. and is hereinafter termed "dry CaASP". This powder did not form a gel upon addition of water.

Example 2

Preparation of Calcium Ammonium Phosphate Compositions from CaCO₃ (CaASP*)

Following the procedure outlined in Example 1 hereinabove, CaASP was prepared by using $CaCO_3$ instead of $CaCl_2$. The product obtained in this process is referred to herein as CaASP*.

In an exemplary procedure, CaASP* was prepared as follows:

Phosphoric acid (60 grams) was slowly added to a mechanically stirred solution containing water (200 grams) and $CaCO_3$ (33 grams), and the reaction mixture was stirred for about 15 minutes until a clear solution was obtained. During the addition, release of $CO_2$ was observed. $NH_4OH$ (32-35 ml of a 22% solution in water) was then added to the mixture to achieve pH around 7, while maintaining the reaction temperature at around 20° C., and the reaction mixture was stirred for another hour, resulting in a one phase free flowing thick gel product.

The solids percentages were determined to be around 32% by weight. The viscosity of the product was determined to be between 100 to 1000 centipoises (cps). The gel was separated into the (aqueous) solution and a solid fraction, and each fraction was tested for the presence of $Ca^{2+}$, $NH_4^+$, and $PO_4^{3-}$ and $H_2O$. The composition of the solution and solid fraction in the product is presented in Table 4 below.

TABLE 4

| State | Weight Percentages | | | |
|---|---|---|---|---|
| | $NH_4^+$ | $Ca^{2+}$ | $PO_4^{3-}$ | $H_2O$ |
| Solid fraction | 7.6 | 15.96 | 70.6 | 6.0 |
| Filtrate | 1.46 | | 6.2 | 92.3 |

The solution trapped in the gel matrix could not be completely separated from the solid. However, upon leaving the gel at room temperature, water evaporated from the gel and it became a dry solid powder. This powder, hereinafter termed "dry CaASP*", could be re-dispersed to re-form a gel, by the subsequent addition of water.

Obtaining the powder was studied under various drying conditions, and the re-dispersability of each sample is presented in Table 5 hereinbelow.

TABLE 5

| Drying Temperature and vacuum | Drying Time | Re-dispersability |
|---|---|---|
| Room Temperature | 5 days | Smooth gel without a gritty feel |
| Room Temperature under vacuum | 1-1.5 day | Smooth gel without a gritty feel |
| 60° C. under vacuum | 24 hours | A gel was not formed Phase separation was observed |
| 250° C. | 10 minutes | Smooth gel without a gritty feel |
| Drum dryer (dropping gel on hot plate) | 5 minutes | Smooth gel without a gritty feel |

These results show that under most drying conditions, the powder obtained upon removal of the solvent re-dispersed in the solution and re-formed a gel when the solvent was added. Furthermore, the drying and solvation cycle did not adversely affect the appearance and feel of the gel, which was still smooth and had no gritty feel. It has been further found that exposure of the dry powder to long term (e.g., 24 hours) heating destroys the gel properties.

Example 3

Preparation of Calcium Ammonium Superphosphate Compositions (CaASP**)

Following the procedure outlined in Example 1 hereinabove, CaASP was prepared by using $Ca(OH)_2$ instead of $CaCl_2$. The product obtained in this process is referred to herein as CaASP**.

In an exemplary procedure, CaASP** was prepared as follows:

Phosphoric acid (60 grams) was slowly added to a mechanically stirred solution containing water (200 grams) and Ca(OH)$_2$ (25 grams), in an exothermic reaction, and the reaction mixture was stirred for about 15 minutes. NH$_4$OH (35-37 ml of a 22-24% solution in water) was further added to the mixture to achieve pH around 7.5, keeping the reaction temperature at around 20° C., and the reaction mixture was stirred for another hour, resulting in a one phase free flowing thick gel product.

Example 4

Preparation of Magnesium Ammonium Superphosphate (MgASP and MgASP*)

Magnesium ammonium superphosphate (MgASP) was prepared according to the CaASP synthesis procedure described in Example 1 hereinabove, using MgCl$_2$ instead of the CaCl$_2$. The product precipitated as a crystalline salt at the beginning of the reaction, and phase separation was observed.

MgASP* was also prepared according to the CaASP* synthesis procedure described in Example 2 hereinabove, using MgCO$_3$ instead of CaCO$_3$. A one-phase free flowing thick gel product was obtained.

Example 5

Preparation of Aluminum Ammonium Superphosphate from Al(OH)$_3$ (AlASP**)

Aluminum ammonium superphosphate (AlASP**) was prepared by slowly adding superphosphoric acid (60 grams, 84% P$_2$O$_5$) to a vigorously mechanically stirred solution containing water (175 grams) and Al(OH)$_3$ di-hydrate (24.5 grams), heated up to 75° C. Once the addition of the superphosphoric acid was completed, the reaction mixture was stirred for about 30 minutes, until a clear solution was obtained. NH$_4$OH (38 ml of a 24% solution in water) was then added to the mixture to achieve a pH around 5. After the addition of about half the amount of NH$_4$OH, the reaction mixture became viscous and a lump was observed. This effect disappeared as the addition continued. The reaction temperature was kept at around 75° C. and the reaction mixture was stirred for another 30 minutes, resulting in a one-phase free flowing thick gel product. The gel was oven dried at 105° C. for 3 hours, and the solids percentage was determined to be around 36% by weight.

The dried gel was tested for the presence of Al$^{3+}$, NH$_4^+$, and PO$_4^{3-}$. Water content was determined by loss on drying (LOD). Comparative results of 4 samples are presented in Table 6 below.

TABLE 6

| | Weight Percentages | | | |
|---|---|---|---|---|
| State | NH$_4^+$ | Al$^{3+}$ | PO$_4^{3-}$ | H$_2$O |
| Sample 1 | 9.37 | 7.41 | 77.7 | 5.7 |
| Sample 2 | 9.94 | 7.67 | 76.9 | 5.9 |
| Sample 3 | 9.86 | 6.75 | 75.3 | 6.1 |
| Sample 4 | 9.3 | 7.43 | 73.2 | 9.1 |

A powder form of AlASP** was obtained by using techniques such as spray drying or paddle drying. A white, free-flowing, fine powder was obtained and no aggregation was observed upon subjecting the powder to heat and pressure, under the aggregation test conditions described hereinabove. This powder was easily re-dispersed in water to achieve a smooth gel.

Example 6

Preparation of a PBBBr Micronized Dispersion

Pentabromobenzylbromide (PBBBr) micronized dispersion was prepared as described in U.S. Provisional Patent Application 60/775,785, filed Feb. 23, 2006, which is incorporated by reference as if fully set forth herein. In brief, granules having a large particle size of d$_{50}$=98 microns (1 Kg) were gradually added to a mixed solution of deionized water (1.5 Kg) containing the dispersing agent Triton X-100 (20 grams). The mill base was ground by a ball mill, using ceramic balls of 0.8 mm, at 200-300 rpm. The milling continued for 2 hours to achieve a particle size around d$_{50}$=2 microns. 35% by weight dry solids were obtained in the milled product after grinding.

Example 7

Preparation of PBBBr Dispersions with Various Calcium Ammonium Phosphates

A PBBBr/CaASP dispersion was prepared by adding to the micronized dispersion of PBBBr (147 grams, containing 50 grams PBBBr) prepared as described in Example 6, deionized water (278 grams), Sb$_2$O$_3$ (25 grams) and an acrylic binder (50 grams). A CaASP gel, prepared a as described in Example 1, (76 grams, 16% by weight solids) was then added to the dispersion. The pH of the dispersion was adjusted to 9 using ammonium hydroxide, and the dispersion was thickened by adding a small amount of carboxymethylcellulose (1.7 grams). The resulting composition, having a 1:5 CaASP: PBBBr weight ratio (thus also referred to herein as the 1:5 dispersion), was smooth, white and appeared as a fluid dispersion. The composition was left on shelf at ambient temperature for approximately 6 months and remained stable during this period. Some properties of the composition are presented in Table 7 below.

TABLE 7

| Composition Properties | Value |
|---|---|
| Viscosity (cP) | 280 |
| Dry solids (wt %) | 22 |
| pH | 9 |
| PBBBr (wt %) | 8.7 |
| Br (wt %) | 7.3 |
| CaASP (wt %) | 1.7 |
| Sb$_2$O$_3$ (wt %) | 4.4 |
| Binder (wt %) | 5.0 |
| CaASP (weight):PBBBr | 1:5.1 (83% PBBBr) |
| Sb:Br (molar) | 1:3 |

Similar dispersions (gels) were prepared, as follows:
(i) a dispersion containing 1:1 CaASP and PBBBr (also referred to herein as the 1:1 dispersion);
(ii) a dispersion containing 1:3 CaASP/PBBBr;
(iii) a dispersion containing 1:5 CaADP/PBBBr;
(iv) a dispersion containing 1:7 CaNH$_4$PO$_4$/PBBBr;
(v) a dispersion containing 1:5 CaASP**/PBBBr; and
(vi) a dispersion containing 1:3 dried CaASP*/PBBBr.

All dispersions were smooth, white and appeared as a fluid dispersion.

Some properties of the PBBBr/CaNH$_4$PO$_4$ dispersion (iv) are presented in Table 8 below.

TABLE 8

| Composition Properties | Value |
| --- | --- |
| Viscosity (cP) | 240 |
| Dry solids (wt %) | 21 |
| pH | 8 |
| PBBBr (wt %) | 7.4 |
| Br (wt %) | 6.1 |
| CaNH$_4$PO$_4$ (wt %) | 1.1 |
| Sb$_2$O$_3$ (wt %) | 4.4 |
| Binder (wt %) | 8.8 |
| CaNH$_4$PO$_4$:PBBBr (weight) | 1:6.7 (87% DECA) |
| Sb:Br (molar) | 1:2.5 |

Some properties of the PBBBr/dried CaASP* dispersion (vi) are presented in Table 9 below.

TABLE 9

| Dispersion Composition | Value |
| --- | --- |
| Viscosity (cP) | 280 |
| Dry solids (wt %) | 35.5% |
| pH | 8-9 |
| PBBBr (wt %) | 14.7 |
| Br (wt %) | 12.2 |
| Dry CaASP* (wt %) | 4.7 |
| Sb$_2$O$_3$ (wt %) | 7.4 |
| Dry CaASP*:PBBBr (weight) | 1:3 (75% PBBBr) |
| Sb:Br (molar) | 1:3 |

Example 8

Preparation of PBBBr/MgASP Dispersion

A PBBBr/MgASP dispersion was prepared similarly to the procedure described in Example 7 hereinabove, using MgASP prepared as described in Example 4. The resulting dispersion was smooth, white and appeared as a fluid dispersion. Some properties of the composition are presented in Table 10 below.

TABLE 10

| Composition Properties | Value |
| --- | --- |
| Viscosity (cP) | 200 |
| Dry solids (wt %) | 20 |
| pH | 8 |
| PBBBr (wt %) | 8.7 |
| Br (wt %) | 7.3 |
| MgASP (wt %) | 1.1 |
| Sb$_2$O$_3$ (wt %) | 4.4 |
| Binder (wt %) | 8.7 |
| MgASP:PBBBr (weight) | 1:8 (88% PBBBr) |
| Sb:Br (molar) | 1:3 |

Example 9

Preparation of DECA Dispersions with Various Calcium Ammonium Phosphates

A DECA/CaASP dispersion was prepared as described in Example 7, using DECA instead of PBBBr. The resulting composition was smooth, white and appeared as a fluid dispersion. Some properties of the composition are presented in Table 11 below.

TABLE 11

| Composition Properties | Value |
| --- | --- |
| Viscosity (cP) | 360 |
| Dry solids (wt %) | 21 |
| pH | 8 |
| DECA (wt %) | 11.1 |
| Br (wt %) | 9.2 |
| CaASP (wt %) | 2.9 |
| Sb$_2$O$_3$ (wt %) | 3.1 |
| Binder | 11.1 |
| CaASP:DECA (weight) | 1:4 (80% DECA) |
| Sb:Br (molar) | 1:5.4 |

A similar dispersion gel was prepared using the CaADP composition, prepared as described in Example 1 hereinabove.

A DECA/CaASP* dispersion was prepared, using the CaASP* composition prepared as described in Example 2 hereinabove. The resulting composition, containing 7.5% by weight of the binder (21% from the total weight of the dry solids) was smooth, white and had good fluidity. Some properties of the composition are presented in Table 12 below.

TABLE 12

| Composition Properties | Value |
| --- | --- |
| Viscosity (cP) | 280 |
| Dry solids (wt %) | 35 |
| pH | 8-9 |
| DECA (wt %) | 14.8 |
| Br (wt %) | 12.3 |
| CaASP* (wt %) | 4.4 |
| Sb$_2$O$_3$ (wt %) | 7.4 |
| CaASP*:DECA | 1:3 (75% DECA) |
| Sb:Br (molar) | 1:3 |

Example 10

Preparation of DECA/Dried AlASP** Dispersion with a 1:3 Sb:Br Ratio

A DECA/dried AlASP dispersion was prepared as described in Example 9 hereinabove, while using a higher amount of deionized water (262 grams instead of 195) and using dried AlASP (60 grams), prepared as described in Example 5 hereinabove, instead of CaASP. The dispersion was thickened by adding 0.4 grams of carboxymethylcellulose. The resulting composition was smooth, white and appeared as a fluid dispersion. Some properties of the dispersion composition are presented in Table 13 below.

TABLE 13

| Composition Properties | Value |
| --- | --- |
| Viscosity (cP) | 200 |
| Dry solids (wt %) | 31 |
| pH | 8-9 |
| DECA (wt %) | 11.7 |
| Br (wt %) | 9.7 |
| AlASP** (wt %) | 7.0 |
| Sb$_2$O$_3$ (wt %) | 5.8 |
| AlASP**:DECA | 1:1.7 (63% DECA) |
| Sb:Br (molar) | 1:3 |

Example 11

Preparation of a DECA/Dried AlASP** Dispersion with a 1:6 Sb:Br Molar Ratio

A DECA/dried AlASP dispersion was prepared by first mixing the dispersing agent Triton X-100 (1 gram) in deionized water (210 grams), and setting the solution to a pH of about 8.5, using ammonia (24% in water). DECA powder (50 grams) and AlASP powder (27 grams), prepared as described in Example 5 hereinabove, were added under continuous mixing while keeping the pH at about 8. No grittiness was observed and the dispersion was smooth. Antimony trioxide (12.5 grams) was added to the dispersion, and mixing was continued for half an hour. The pH was set depending on the required application, ranging from 5.5 (using $H_3PO_4$) to 9 (using ammonia, 24% in water). The dispersion was further thickened by an acrylic binder (50 grams) and a cellosize thickener (1 gram). Some properties of the composition are displayed in Table 14 below.

TABLE 14

| Composition Properties | Value |
| --- | --- |
| Viscosity (cP) | 200 |
| Dry solids (wt %) | 34 |
| pH | 8-9 |
| DECA (wt %) | 14.2 |
| Br (wt %) | 11.8 |
| AlASP** (wt %) | 7.7 |
| $Sb_2O_3$ (wt %) | 3.6 |
| Binder (wt %) | 8.5 |
| AlASP**:DECA | 1:1.8 (65% DECA) |
| Sb:Br (molar) | 1:6 |

Another composition, prepared by mixing a DECA powder and an AlASP powder, at the same DECA/AlASP ratio (65% DECA) was similarly prepared in order to assess the mixed powder properties. This powder was a free-flowing powder, similarly to the DECA powder or the AlASP** powder, and no aggregation was observed upon application of heat and pressure, under the aggregation test conditions described hereinabove.

Example 12

Preparation of DECA/Dried AlASP** Dispersion with a 1:14 Sb:Br Molar Ratio

A DECA/dried AlASP** dispersion was prepared as described in Example 11 hereinabove, using a reduced amount of deionized water (200 grams instead of 210 grams), a higher amount of DECA powder (56 grams instead of 50 grams), and a substantially lower amount of antimony trioxide (6.0 grams instead of 12.5 grams). Some properties of the composition are displayed in Table 15 below.

TABLE 15

| Composition properties | Value |
| --- | --- |
| Viscosity (cP) | 200 |
| Dry solids (wt %) | 34 |
| pH | 8-9 |
| DECA (wt %) | 16.4 |
| Br (wt %) | 13.6 |
| AlASP** (wt %) | 7.9 |
| $Sb_2O_3$ (wt %) | 1.8 |
| Binder (wt %) | 8.5 |

TABLE 15-continued

| Composition properties | Value |
| --- | --- |
| AlASP**:DECA | 1:2 (66% deca) |
| Sb:Br (molar) | 1:14 |

Example 13

Preparation of Hexabromocyclododecane (HBCD)/Dried AlASP Dispersion with No Antimony Oxide A hexabromocyclododecane (HBCD)/AlASP dispersion is prepared as described in Example 10, using HBCD instead of DECA. No antimony oxide was added.

Similar dispersions containing AlASP** and other brominated flame retardants have a labile bromine, and devoid of ATO are similarly prepared.

Example 14

Application of Various PBBBr/CaASP Dispersions on 100% Rib Knitted Cotton Fabric The PBBBr/CaASP, PBBBr/dried CaASP and PBBBr/Ca$(NH_4)PO_4$ smoldering suppressant dispersions prepared as described in Example 7 hereinabove were padded on a 100% Rib knitted cotton fabric weighing 216 grams/m². The cured cotton fabric was washed according to Standard Laboratory Practice for Home Laundering (AATCC technical manual/2001), repeating the washing process between 2 and 25 times. The washed fabric was tested according to ASTM D 6413 12 seconds ignition test. Some of the results are presented in comparative Table 16 below (all percentages are weight percentages).

TABLE 16

| | PBBBr/CaASP | PBBBr/dried CaASP | PBBBr/CaNH$_4$PO$_4$ |
| --- | --- | --- | --- |
| % PBB-Br | 12.5 | 12.5 | 14.6 |
| % Br | 10.5 | 10.5 | 12.3 |
| % CaASP | 2.4 | 3.0 | 3.3 |
| % Sb$_2$O$_3$ | 6.3 | 6.2 | 7.3 |
| Sb:Br (molar) | 1:3 | 1:3 | 1:3 |
| No. of laundry cycles | 25 | 2 | 4 |
| After flame time (seconds) | 0.56 | 0.5 | 1 |
| after glow time (seconds) | 38 | >250 | 264 |
| char length (cm) | 14.6 | Fail | 16.8 |

Fail: >18 centimeters.

Example 15

Application of PBBBr/CaASP* Dispersions on 100% Rib Knitted Cotton Fabric

The PBBBr/CaASP* smoldering suppressant dispersions prepared as described in Example 7 hereinabove were padded on a 100% Rib knitted cotton fabric weighing 216 grams/m². The cured cotton fabric was washed according to Standard Laboratory Practice for Home Laundering (AATCC technical manual/2001). After 1 washing cycle, the fabric was dried, weighed and its composition was determined. The obtained data is presented in Table 17 below:

TABLE 17

| Dispersion Composition | Value |
|---|---|
| Add-on (wt %) | 30.4 |
| PBBBr (wt %) | 13.3 |
| Br (wt %) | 11.2 |
| CaASP* (wt %) | 2.6 |
| $Sb_2O_3$ (wt %) | 6.7 |
| Sb:Br (molar) | 1:3 |

The washed fabric was cured at 105° C. for 30 minutes to achieve a bone-dry sample and passed an ASTM D 6413-99 12 seconds ignition test with an after flame time of 1.5 seconds, an after glow time of 119 seconds and a char length of 15.5 centimeters.

Example 16

Application of PBBBr/CaASP** Dispersions on 100% Rib Knitted Cotton Fabric

The PBBBr/CaASP** smoldering suppressant dispersions prepared as described in Example 7 were padded on a 100% Rib knitted cotton fabric weighing 216 grams/m². The cured cotton fabric was washed according to Standard Laboratory Practice for Home Laundering (AATCC technical manual/2001). After 5 washing cycles, the fabric was dried, weighed and its composition was determined. The obtained data is presented in Table 18 below.

TABLE 18

| Dispersion Composition | Value |
|---|---|
| Add-on (wt %) | 31.6 |
| PBBBr (wt %) | 13.3 |
| Br (wt %) | 11.2 |
| CaASP* (wt %) | 2.6 |
| $Sb_2O_3$ (wt %) | 6.7 |
| Sb:Br | 1:3 |

The washed fabric was cured at 105° C. for 30 minutes to achieve a bone-dry sample and passed an ASTM D 6413-99 12 seconds ignition test with an after flame time of 0.75 seconds, and an after glow time of 103 seconds, but failed in the char length (>18 centimeters).

Example 17

Application of PBBBr/MgASP Dispersions on 100% Rib Knitted Cotton Fabric

The PBBBr/MgASP smoldering suppressant dispersions prepared as described in Example 8 hereinabove were padded on a 100% Rib knitted cotton fabric weighing 216 grams/m². The cured cotton fabric was washed according to Standard Laboratory Practice for Home Laundering (AATCC technical manual/2001). After 2 washing cycles, the fabric was dried, weighed and its composition was determined. The obtained data is presented in Table 19 below.

TABLE 19

| Dispersion Composition | Value |
|---|---|
| Add-on (wt %) | 33.2 |
| PBBBr (wt %) | 14.5 |
| Br (wt %) | 12.2 |
| CaASP* (wt %) | 2.8 |
| $Sb_2O_3$ (wt %) | 7.3 |
| Sb:Br | 1:3.6 |

The washed fabric was cured at 105° C. for 30 minutes to achieve a bone-dry sample and passed an ASTM D 6413-99 12 seconds ignition test with an after flame time of 0.8 seconds, and an after glow time of 106 seconds, but failed in the char length (>18 centimeters).

Example 18

Application of DECA/CaASP and DECA/CaADP Dispersions on 100% Rib Knitted Cotton Fabric The DECA/CaASP and DECA/CaADP smoldering suppressant dispersions prepared as described in Example 9 hereinabove were padded on a 100% Rib knitted cotton fabric weighing 216 grams/m². The cured cotton fabric was washed according to Standard Laboratory Practice for Home Laundering (AATCC technical manual/2001), repeating the washing process either 3 or 5 times. The washed fabric was tested according to ASTM D 6413 12 seconds ignition test. Some of the results are presented in comparative Table 20 below (all percentages are weight percentages).

TABLE 20

| | DECA/ CaASP Sample 1 | DECA/ CaASP Sample 2 | DECA/ CaADP |
|---|---|---|---|
| % DECA | 13.6 | 17.2 | 13.8 |
| % Br | 11.4 | 14.2 | 11.4 |
| % CaASP | 2.6 | 4.5 | 3.6 |
| % $Sb_2O_3$ | 6.8 | 4.8 | 6.9 |
| Sb:Br (molar) | 1:3 | 1:5.4 | 1:3 |
| No. of laundry cycles | 5 | 3 | 5 |
| After flame time (seconds) | 0.6 | 0 | 1.25 |
| after glow time (seconds) | 100 | 174 | 194 |
| char length (cm) | 16.5 | 13.7 | 13.2 |

Example 19

Application of DECA/CaASP* and DECA/Dried CaASP* Dispersions on 100% Sateen Woven Cotton Fabric The DECA/CaASP* smoldering suppressant dispersions prepared as described in Example 9 hereinabove were padded on a 100% sateen woven cotton fabric weighing 122 grams/m². Table 21 describes the fabric composition after being padded with the CaASP* before laundry.

TABLE 21

| Fabric Composition | Value |
|---|---|
| Add-on (wt %) | 39.3 |
| DECA (wt %) | 16.6 |
| Br (wt %) | 13.8 |
| CaASP* (wt %) | 4.4 |
| $Sb_2O_3$ (wt %) | 8.3 |
| Sb:Br | 1:3 |

After 5 washing cycles, the fabric was dried, weighed and the change in the composition caused by the washing cycles was determined. The obtained data is presented in Table 22 below.

TABLE 22

| | % of additives on fabric |
|---|---|
| Add-on (wt %) | 32.7 |
| DECA (wt %) | 13.8 |
| Br (wt %) | 11.5 |
| CaASP* (wt %) | 4.1 |
| $Sb_2O_3$ (wt %) | 6.9 |
| Sb:Br (molar) | 1:3 |

The washed fabric was cured at 105° C. for 30 minutes to achieve a bone-dry sample and passed an ASTM D 6413-99 12 seconds ignition test with an after flame time of 0 seconds, an after glow time of 70 seconds and a char length of 16 centimeters.

As a comparison, the DECA/dried CaASP* smoldering suppressant dispersion, prepared as described in Example 9 hereinabove, was padded on a 100% sateen woven cotton fabric weighing 122 grams/m². Curing and fixation were followed by incubation at 105° C. for 30 minutes, to achieve a bone-dry fabric. Table 23 below describes the fabric composition after being padded, before laundry.

TABLE 23

| Fabric Composition | Value |
|---|---|
| Add-on (wt %) | 40.9 |
| DECA (wt %) | 17.0 |
| Br (wt %) | 14.1 |
| CaASP* (wt %) | 5.4 |
| $Sb_2O_3$ (wt %) | 8.5 |
| Sb:Br (molar) | 1:3 |

After 5 washing cycles, the fabric was cured at 105° C. for 30 minutes to achieve a bone-dry sample and passed an ASTM D 6413-99 12 seconds ignition test with an after flame time of 0 seconds, an after glow time of 82 seconds and a char length of 14 centimeters.

Example 20

Application of DECA/Dried AlASP 1:3 Sb:Br Dispersions on 100% Knitted Cotton Fabric The DECA/dried AlASP smoldering suppressant dispersion prepared as described in Example 10 hereinabove was padded on a 100% knitted cotton fabric weighing 200 grams/m². Curing and fixation were followed by incubation at 105° C. for 30 minutes, to achieve a bone-dry fabric. Table 24 below describes the fabric composition after being padded with the AlASP** dispersion, before laundry.

TABLE 24

| Fabric composition | Value |
|---|---|
| Add-on (wt %) | 33.8 |
| DECA (wt %) | 12.9 |
| Br (wt %) | 10.7 |
| AlASP** (wt %) | 7.8 |
| $Sb_2O_3$ (wt %) | 6.5 |
| Sb:Br | 1:3 |

After 5 washing cycles, the washed fabric was cured at 105° C. for 30 minutes to achieve a bone-dry sample and passed an ASTM D 6413-99 12 seconds ignition test with an after flame time of 0 seconds, an after glow time of 75 seconds and a char length of 14.6 centimeters.

Example 21

Application of DECA/Dried AlASP 1:6 Sb:Br Dispersion on 100% Knitted Cotton Fabric The DECA/dried AlASP smoldering suppressant dispersions prepared as described in Example 11 hereinabove were padded on a 100% knitted cotton fabric weighing 200 grams/m². Curing and fixation were followed by incubation at 105° C. for 30 minutes, to achieve a bone-dry fabric. Table 25 below describes the composition of a fabric padded with the DECA/dried AlASP** dispersion, before laundry.

TABLE 25

| Fabric Composition | Value |
|---|---|
| Add-on (wt %) | 39.5 |
| DECA (wt %) | 16.8 |
| Br (wt %) | 13.9 |
| AlASP** (wt %) | 9.1 |
| $Sb_2O_3$ (wt %) | 4.2 |
| Sb:Br | 1:6 |

After 30 laundry cycles the washed fabric was cured at 105° C. for 30 minutes to achieve a bone-dry sample and passed an ASTM D 6413-99 12 seconds ignition test with an after flame time of 0 seconds, an after glow time of 20 seconds and a char length of 14.0 centimeters. A similar sample was tested after 5 laundry cycles and passed an ASTM D 6413-99 12 seconds ignition test with an after glow time of 45 seconds.

Example 22

Application of DECA/Dried AlASP 1:14 Sb:Br Dispersion on 100% Knitted Cotton Fabric The DECA/dried AlASP smoldering suppressant dispersion prepared as described in Example 12 hereinabove was padded on a 100% knitted cotton fabric weighing 200 grams/m². Curing and fixation were followed by incubation at 105° C. for 30 minutes, to achieve a bone-dry fabric. Table 26 below describes the composition of a fabric padded with the DECA/dried AlASP** dispersion, before laundry.

TABLE 26

| Fabric composition | Value |
|---|---|
| Add-on (wt %) | 35.5 |
| DECA (wt %) | 17.1 |
| Br (wt %) | 14.2 |
| AlASP** (wt %) | 8.3 |

TABLE 26-continued

| Fabric composition | Value |
|---|---|
| $Sb_2O_3$ (wt %) | 1.8 |
| Sb:Br | 1:14 |

After 5 laundry cycles the washed fabric was cured at 105° C. for 30 minutes to achieve a bone-dry sample and passed an ASTM D 6413-99 12 seconds ignition test with an after flame time of 0 seconds, an after glow time of 16 seconds and a char length of 13.5 centimeters.

Example 23

Preparation of FR-720/Dried AlASP** Dispersion with a 1:6 Sb:Br Molar Ratio

The present inventors have identified milling parameters that enable providing FR-720-containing textile formulation which have dispersability properties suitable for application onto cotton fabric, for example.

An FR-720 formulation was prepared as follows:
FR-720 (ICL-IP) was dispersed in water using the nonionic dispersing agent TERGITOL™XD (Dow) and the pH was adjusted to 8-9 using ammonia in water.

Using a grinding apparatus (Mill model: Agitator Bead Mill, Dyno®-Mill MULTILAB) with 65% of the milling vessel volume filled with 1 mm diameter ceramic balls and a milling rate of 3-4 kg/hour, a smooth and uniform mill base of the FR-720 dispersion was obtained.

The obtained mill base serves as a concentrate, which is used for preparing the full textile formulations. The concentrate was non gritty and the FR-720 was homogenously dispersed.

A phase separation was observed in the obtained mill base dispersion after one day. Solid content was about 40%. Addition of 0.5% of carboxymethyl cellulose (CMC) was effective in avoiding cake formation and to enable easy re-dispersion of the concentrate before use.

$Sb_2O_3$, AlASP** and an acrylic binder were added to the concentrate and the formulation was thickened with a thickening agent CELLOSIZE HEC QP-100MH (Dow).

As is detailed in the Background section hereinabove, when a FR formulation is applied on textiles, large amounts of $Sb_2O_3$ are undesirable due to cost, toxicity, environmental concerns and increase in the total add-on.

In the formulation described herein, the amount of the flame retardant synergist $Sb_2O_3$ required to exhibit the desired properties is relatively low, such that the formulation had a Sb:Br molar ratio of 1:6.

Some properties of the formulation are presented in Table 27 below.

TABLE 27

| Properties | Value |
|---|---|
| Dry solids (wt %) | 40 |
| pH | 8 |
| FR-720 (wt %) | 18.7 |
| Br (wt %) | 12.6 |
| AlASP** (wt %) | 8.3 |
| $Sb_2O_3$ (wt %) | 4.3 |
| Binder (wt %) | 15.0 |
| Sb:Br (molar) | 1:6 |

Example 24

Application of FR-720/Dried AlASP on 100% Knitted Cotton Fabric

The FR-720/dried AlASP** smoldering suppressant dispersion prepared as described in Example 23 hereinabove was padded on a 100% knitted cotton fabric weighing 200 grams/$m^2$. The formulation went smoothly onto the fabric and no grittiness or accumulation on the pad rollers was observed.

Table 28 below presents various features of a fabric padded with the F2-720/dried AlASP** dispersion, before laundry.

TABLE 28

| Fabric composition | Value |
|---|---|
| Add-on (wt %) | 30 |
| FR-720 (wt %) | 14.2 |
| Br (wt %) | 9.6 |
| AlASP** (wt %) | 6.3 |
| $Sb_2O_3$ (wt %) | 3.3 |
| Sb:Br | 1:6 |

After 15 laundry cycles the washed fabric were cured at 105° C. for 30 minutes to achieve a bone-dry sample and passed an ASTM D 6413-99 12 seconds ignition test with an after flame time of 0 seconds, an after glow time of 33 seconds and a char length of 14 centimeters.

The above results show that a short pre-milling of the FR-720 dispersion has yielded a smooth and uniform FR-720 concentrate, with good dispersion properties, whereby the milling process does not affect the flame retardancy properties thereof. The concentrate can be beneficially used for preparing a washing-fast FR and SS textile formulation.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A smoldering suppressing composition comprising a water-insoluble complex which consists of a multivalent metal and an ammonium salt of superphosphoric acid, wherein said complex contains $PO_4^{3-}$ in an amount of at least 60 weight percents.

2. The smoldering suppressing composition of claim 1, wherein said superphosphoric acid comprises at least 82 weight percents of $P_2O_5$.

3. The smoldering suppressing composition of claim 2, wherein said superphosphoric acid comprises at least 83 weight percents of $P_2O_5$.

4. The smoldering suppressing composition of claim 1, wherein said superphosphoric acid comprises less than 35 weight percents of pyrophosphoric acid.

5. The smoldering suppressing composition of claim 4, wherein said superphosphoric acid comprises less than 15 weight percents of pyrophosphoric acid.

6. The composition of claim 1, further comprising an aqueous solution, the composition being in a form of a gel.

7. The composition of claim 6, wherein said gel is an amorphous gel.

8. The composition of claim 1, being in a form of a dry powder.

9. The composition of claim 8, wherein said dry powder is a gellable powder, forming a gel upon contacting an aqueous solution.

10. A process of preparing the composition claim 1, the process comprising mixing said superphosphoric acid, a salt of said multivalent metal, and ammonia, thereby obtaining the composition.

11. The process of claim 10, wherein said salt is selected from the group consisting of a chloride salt, a carbonate salt and a hydroxy salt.

12. The process of claim 10, wherein said mixing is performed in the presence of an aqueous solution.

13. The process of claim 12, wherein said mixing is performed while maintaining a pH of said solution higher than 7.

14. The process of claim 10, wherein said mixing is performed at a temperature that ranges from about 50 ° C. to about 150 ° C.

15. The process of claim 10, further comprising drying the composition, to thereby obtain a powder.

16. A smoldering suppressing formulation comprising the composition of claim 1.

17. A flame retardant and smoldering suppressing formulation comprising the smoldering suppressing composition of claim 1 and at least one flame retardant.

18. The formulation of claim 17, wherein said at least one flame retardant is selected from the group comprising of decabromodiphenyloxide (DECA), hexabromocyclododecane (HBCD), tetrabromobisphenol A - bis(2,3-dibromopropyl ether) (FR-720) and pentabromobenzylbromide (PBBBr).

19. The formulation of claim 17, wherein said flame retardant is tetrabromobisphenol A - bis(2,3-dibromopropyl ether) (FR-720).

20. The formulation of claim 17, being in a form of an aqueous dispersion.

21. The formulation of claim 17, further comprising a flame retardant synergist.

22. The formulation of claim 21, wherein said synergist is antimony oxide (AO).

23. The formulation of claim 22, wherein a molar ratio between an elemental antimony in said AO and an elemental halogen in said halogenated flame retardant ranges from 1:1 to 1:50.

24. A kit comprising a packaging material and the smoldering suppressing composition of claim 1, being packaged in said packaging material.

25. The kit of claim 24, wherein said smoldering suppressing composition is in a powder form.

26. The kit of claim 25, further comprising an aqueous solution, wherein said powder and said aqueous solution are individually packaged within the kit.

27. The kit of claim 25, further comprising a flame retardant.

28. The kit of claim 26, further comprising a flame retardant.

29. A kit comprising a packaging material and the smoldering suppressing formulation of claim 16, being packaged in said packaging material.

30. A kit comprising a packaging material and the smoldering suppressing and flame retardant formulation of claim 17, being packaged in said packaging material.

31. An article-of-manufacture comprising a flammable substrate and the smoldering suppressing formulation of claim 16 being applied thereon.

32. The article-of-manufacture of claim 31, wherein said flammable substrate comprises a flammable textile fabric.

33. The article-of-manufacture of claim 31, characterized by an after flame time, as defined by ASTM D 6413 12 seconds ignition test, of less than 3 seconds.

34. The article-of-manufacture of claim 33, characterized by an after flame time, as defined by ASTM D 6413 12 seconds ignition test, of 0 seconds.

35. The article-of-manufacture of claim 33, wherein said after flame time remains substantially unchanged upon subjecting said article-of-manufacture to at least 1 washing cycle.

36. The article-of-manufacture of claim 35, wherein said after flame time remains substantially unchanged upon subjecting said article-of-manufacture to at least 25 washing cycles.

37. The article-of-manufacture of claim 31, characterized by an after glow time, as defined by ASTM D 6413 12 seconds ignition test, of less than 150 seconds.

38. The article-of-manufacture of claim 37, characterized by an after glow time, as defined by ASTM D 6413 12 seconds ignition test, of less than 30 seconds.

39. The article-of-manufacture of claim 37, wherein said after glow time remains substantially unchanged upon subjecting said article-of-manufacture to at least 1 washing cycle.

40. The article-of-manufacture of claim 39, wherein said after glow time remains substantially unchanged upon subjecting said article-of-manufacture to at least 25 washing cycles.

41. The article-of-manufacture of claim 31, characterized by a char length, as defined by ASTM D 6413 12 seconds ignition test, of less than 25 centimeters.

42. The article-of-manufacture of claim 41, characterized by a char length, as defined by ASTM D 6413 12 seconds ignition test, of less than 15 centimeters.

43. The article-of-manufacture of claim 41, wherein said char length remains substantially unchanged upon subjecting said article-of-manufacture to at least 1 washing cycle.

44. The article-of-manufacture of claim 43, wherein said char length remains substantially unchanged upon subjecting said article-of-manufacture to at least 25 washing cycles.

45. The article-of-manufacture of claim 31, characterized as passing an ASTM D 6413 12 seconds ignition test.

46. The article-of-manufacture of claim 45, characterized as passing an ASTM D 6413 12 seconds ignition test, upon subjecting said article-of-manufacture to at least 1 washing cycle.

47. The article-of-manufacture of claim 46, characterized as passing an ASTM D 6413 12 seconds ignition test, upon subjecting said article-of-manufacture to at least 25 washing cycles.

48. The article-of-manufacture of claim 31, being characterized by at least one aesthetical or textural property which is substantially the same as that of said flammable substrate per se.

49. The article-of-manufacture of claim 48, wherein said property remains substantially unchanged upon subjecting said article-of-manufacture to at least 1 washing cycle.

50. The article-of-manufacture of claim 49, wherein said property remains substantially unchanged upon subjecting said article-of-manufacture to at least 25 washing cycles.

51. A process of applying the formulation of claim 16 to a textile substrate, the process comprising contacting the substrate with the smoldering suppressing formulation.

52. The process of claim 51, further comprising, subsequent to said contacting, heating the substrate.

53. A smoldering suppressing composition comprising a water-insoluble complex which comprises of a multivalent metal and an ammonium salt of superphosphoric acid, the composition being in a form of a dry gellable powder which forms a gel upon contacting an aqueous solution, or, when the composition further comprises an aqueous solution, the composition is in a form of an amorphous gel.

54. A smoldering suppressing formulation comprising the composition of claim 53.

55. A flame retardant and smoldering suppressing formulation comprising the smoldering suppressing composition of claim 53 and at least one flame retardant.

56. The formulation of claim 55, being in a form of an aqueous dispersion.

57. The formulation of claim 56, further comprising a flame retardant synergist.

58. A kit comprising a packaging material and the smoldering suppressing composition of claim 53, being packaged in said packaging material.

59. The kit of claim 58, wherein said smoldering suppressing composition is in said form of a powder, and the kit further comprises said aqueous solution, wherein said powder and said aqueous solution are individually packaged within the kit.

60. The kit of claim 59, further comprising a flame retardant.

61. An article-of-manufacture comprising a flammable substrate and the smoldering suppressing formulation of claim 54 being applied thereon.

62. The article-of-manufacture of claim 61, wherein said flammable substrate comprises a flammable textile fabric.

63. A process of applying the formulation of claim 54 to a textile substrate, the process comprising contacting the substrate with the smoldering suppressing formulation.

* * * * *